United States Patent
Sadr et al.

(10) Patent No.: US 9,883,337 B2
(45) Date of Patent: Jan. 30, 2018

(54) LOCATION BASED SERVICES FOR RFID AND SENSOR NETWORKS

(71) Applicant: Mojix, Inc., Los Angeles, CA (US)

(72) Inventors: Ramin Sadr, Los Angeles, CA (US); Bandel Louis Carano, Palo Alto, CA (US)

(73) Assignee: Mijix, Inc., Los Angeles, CA (US)

( * ) Notice: Subject to any disclaimer, the term of this patent is extended or adjusted under 35 U.S.C. 154(b) by 0 days.

(21) Appl. No.: 15/138,179

(22) Filed: Apr. 25, 2016

(65) Prior Publication Data

US 2016/0316325 A1 Oct. 27, 2016

Related U.S. Application Data

(60) Provisional application No. 62/152,713, filed on Apr. 24, 2015.

(51) Int. Cl.
*H04B 7/00* (2006.01)
*H04W 4/02* (2009.01)
*H04W 4/00* (2009.01)

(52) U.S. Cl.
CPC ............ *H04W 4/02* (2013.01); *H04W 4/008* (2013.01); *H04W 4/026* (2013.01); *H04W 4/027* (2013.01)

(58) Field of Classification Search
CPC ...................................................... H04W 4/02
(Continued)

(56) References Cited

U.S. PATENT DOCUMENTS

| 3,130,408 A | 4/1964 | Kumano |
| 4,595,915 A | 6/1986 | Close |

(Continued)

FOREIGN PATENT DOCUMENTS

| EP | 1313249 A2 | 5/2003 |
| EP | 1362320 A2 | 11/2003 |

(Continued)

OTHER PUBLICATIONS

"OMRON Develops World-First RFID Technology for Measuring the Distance Between UHF-Band Antenna and IC Tags," http://www.finanznachrichten.de/nachrichten-2007-09/artikel-8988010.asp, Sep. 10, 2007.

(Continued)

*Primary Examiner* — Nay A Maung
*Assistant Examiner* — Angelica M Perez
(74) *Attorney, Agent, or Firm* — KPPB LLP

(57) ABSTRACT

Systems and methods for generating sensor tag locations expressed in a three-dimension global coordinate system from sensor tag locations expressed in three-dimensional local coordinate systems of mobile readers that read each tag and for updating the paths of each mobile reader are disclosed. In one embodiment, a method includes receiving sensor data from one or more mobile reader agents, receiving tag location data that describes the location of one or more sensor tags expressed in local coordinates of the subspace of the mobile reader agent that read the sensor tag, converting the tag location data into a global coordinate system that is common to all mobile reader agents, and updating one or more paths of one or more mobile reader agents to increase the coverage of reading tags in the subspace of the mobile reader agent.

18 Claims, 27 Drawing Sheets

(58) Field of Classification Search
USPC .................................................. 455/41.2
See application file for complete search history.

(56) References Cited

U.S. PATENT DOCUMENTS

| | | | |
|---|---|---|---|
| 4,903,033 A | 2/1990 | Tsao et al. | |
| 5,001,492 A | 3/1991 | Shapiro et al. | |
| 5,040,191 A | 8/1991 | Forney et al. | |
| 5,061,943 A | 10/1991 | Rammos | |
| 5,126,748 A | 6/1992 | Ames et al. | |
| 5,227,803 A | 7/1993 | O'Connor et al. | |
| 5,365,516 A | 11/1994 | Jandrell | |
| 5,369,404 A | 11/1994 | Galton | |
| 5,448,250 A | 9/1995 | Day | |
| 5,525,991 A | 6/1996 | Nagura et al. | |
| 5,602,741 A | 2/1997 | Talbot et al. | |
| 5,640,151 A | 6/1997 | Reis et al. | |
| 5,648,767 A | 7/1997 | O'Connor et al. | |
| 5,684,832 A | 11/1997 | Adachi et al. | |
| 5,929,701 A | 7/1999 | Rice | |
| 5,936,527 A | 8/1999 | Isaacman et al. | |
| 5,955,966 A | 9/1999 | Jeffryes et al. | |
| 5,963,149 A | 10/1999 | Nagura | |
| 6,037,898 A | 3/2000 | Parish et al. | |
| 6,042,547 A | 3/2000 | Wright et al. | |
| 6,127,981 A | 10/2000 | Pritchett et al. | |
| 6,184,841 B1 | 2/2001 | Shober et al. | |
| 6,233,290 B1 | 5/2001 | Raphaeli | |
| 6,236,367 B1 | 5/2001 | Du Toit et al. | |
| 6,252,542 B1 | 6/2001 | Sikina et al. | |
| 6,252,553 B1 | 6/2001 | Solomon | |
| 6,353,406 B1 | 3/2002 | Lanzl et al. | |
| 6,377,217 B1 | 4/2002 | Zhu et al. | |
| 6,392,544 B1 | 5/2002 | Collins | |
| 6,396,438 B1 | 5/2002 | Seal | |
| 6,456,239 B1 | 9/2002 | Werb et al. | |
| 6,531,984 B1 | 3/2003 | Johannisson et al. | |
| 6,549,166 B2 | 4/2003 | Bhattacharyya et al. | |
| 6,574,478 B1 | 6/2003 | Mortensen | |
| 6,600,443 B2 | 7/2003 | Landt | |
| 6,678,340 B1 | 1/2004 | Khlat et al. | |
| 6,750,757 B1 | 6/2004 | Gabig, Jr. et al. | |
| 6,825,754 B1 | 11/2004 | Rolin | |
| 6,831,608 B2 | 12/2004 | Arvidsson | |
| 6,836,472 B2 | 12/2004 | O'Toole et al. | |
| 6,897,809 B2 | 5/2005 | Carson et al. | |
| 6,903,656 B1 | 6/2005 | Lee | |
| 6,917,291 B2 | 7/2005 | Allen | |
| 6,982,670 B2 | 1/2006 | Mohamadi | |
| 6,995,711 B2 | 2/2006 | Killen et al. | |
| 7,002,461 B2 | 2/2006 | Duncan et al. | |
| 7,009,561 B2 | 3/2006 | Menache et al. | |
| 7,024,331 B2 | 4/2006 | Jones et al. | |
| 7,026,935 B2 | 4/2006 | Diorio et al. | |
| 7,030,761 B2 | 4/2006 | Bridgelall et al. | |
| 7,035,322 B2 | 4/2006 | Girard | |
| 7,076,000 B2 | 7/2006 | Rodriguez | |
| 7,119,738 B2 | 10/2006 | Bridgelall et al. | |
| 7,155,172 B2 | 12/2006 | Scott | |
| 7,161,489 B2 | 1/2007 | Sullivan et al. | |
| 7,187,288 B2 | 3/2007 | Mendolia et al. | |
| 7,212,116 B2 | 5/2007 | Wang et al | |
| 7,228,228 B2 | 6/2007 | Bartlett et al. | |
| 7,253,717 B2 | 8/2007 | Armstrong et al. | |
| 7,260,369 B2 | 8/2007 | Feher | |
| 7,271,765 B2 | 9/2007 | Stilp et al. | |
| 7,289,064 B2 | 10/2007 | Cheng | |
| 7,289,815 B2 | 10/2007 | Gfeller et al. | |
| 7,345,625 B1 | 3/2008 | Urkowitz | |
| 7,362,266 B2 | 4/2008 | Collinson | |
| 7,378,967 B2 | 5/2008 | Sullivan et al. | |
| 7,418,065 B2 | 8/2008 | Qiu et al. | |
| 7,423,586 B2 | 9/2008 | Schieblich | |
| 7,432,855 B2 | 10/2008 | Mohamadi | |
| 7,432,874 B2 | 10/2008 | Meissner | |
| 7,477,193 B2 | 1/2009 | Evers et al. | |
| 7,528,776 B2 | 5/2009 | Montuno | |
| 7,561,053 B2 | 7/2009 | Hecht et al. | |
| 7,592,909 B2 | 9/2009 | Zaruba et al. | |
| 7,599,441 B2 | 10/2009 | Ma et al. | |
| 7,627,329 B2 | 12/2009 | Mizugaki et al. | |
| 7,633,377 B2 | 12/2009 | Sadr | |
| 7,652,577 B1 | 1/2010 | Madhow et al. | |
| 7,667,652 B2 | 2/2010 | Gevargiz et al. | |
| 7,692,532 B2 | 4/2010 | Fischer et al. | |
| 7,710,320 B2 | 5/2010 | Fullerton et al. | |
| 7,789,308 B2 | 9/2010 | Droms et al. | |
| 7,800,541 B2 | 9/2010 | Moshfeghi | |
| 7,825,858 B2 | 11/2010 | Blessing et al. | |
| 7,873,326 B2 | 1/2011 | Sadr | |
| 7,917,155 B2 | 3/2011 | Karr et al. | |
| 7,973,701 B2 | 7/2011 | Lohmeier et al. | |
| 8,072,311 B2 | 12/2011 | Sadr et al. | |
| 8,258,925 B2 | 9/2012 | Lam et al. | |
| 8,395,482 B2 | 3/2013 | Sadr et al. | |
| 8,400,271 B2 | 3/2013 | Sadr | |
| 8,552,835 B2 | 10/2013 | Sadr | |
| 8,570,172 B2 | 10/2013 | Al-Mahdawi | |
| 8,712,444 B2 | 4/2014 | Dahl et al. | |
| 8,768,248 B2 | 7/2014 | Sadr | |
| 8,830,091 B2 | 9/2014 | Karlsson et al. | |
| 8,941,472 B2 | 1/2015 | Sadr | |
| 8,981,908 B2 | 3/2015 | Sadr | |
| 9,008,239 B2 | 4/2015 | Sadr et al. | |
| 9,014,635 B2 | 4/2015 | Sadr et al. | |
| 9,014,970 B2 * | 4/2015 | Oi | G06F 17/30241 |
| | | | 701/400 |
| 9,291,699 B2 | 3/2016 | Sadr et al. | |
| 9,312,987 B2 | 4/2016 | Sadr et al. | |
| 2001/0001616 A1 | 5/2001 | Rakib et al. | |
| 2001/0017898 A1 | 8/2001 | Raheli et al. | |
| 2001/0022813 A1 | 9/2001 | Tan et al. | |
| 2002/0024448 A1 | 2/2002 | Olesen et al. | |
| 2002/0042290 A1 | 4/2002 | Williams et al. | |
| 2002/0057729 A1 | 5/2002 | Farbod et al. | |
| 2002/0063622 A1 | 5/2002 | Armstrong et al. | |
| 2002/0091666 A1 | 7/2002 | Rice et al. | |
| 2002/0093454 A1 | 7/2002 | Kim et al. | |
| 2002/0113736 A1 | 8/2002 | Toutain et al. | |
| 2002/0122472 A1 | 9/2002 | Lay | |
| 2002/0131515 A1 | 9/2002 | Rodriguez | |
| 2002/0135513 A1 | 9/2002 | Paschen et al. | |
| 2002/0159540 A1 | 10/2002 | Chiodini | |
| 2003/0007473 A1 | 1/2003 | Strong et al. | |
| 2003/0138055 A1 | 7/2003 | Saito et al. | |
| 2004/0001460 A1 | 1/2004 | Bevan et al. | |
| 2004/0042539 A1 | 3/2004 | Vishakhadatta et al. | |
| 2004/0058749 A1 | 3/2004 | Pirritano et al. | |
| 2004/0061644 A1 | 4/2004 | Lier et al. | |
| 2004/0067764 A1 | 4/2004 | Pratt et al. | |
| 2004/0201539 A1 | 10/2004 | Yewen | |
| 2004/0263388 A1 | 12/2004 | Krumm et al. | |
| 2005/0018861 A1 | 1/2005 | Tashev | |
| 2005/0079871 A1 | 4/2005 | Kirk et al. | |
| 2005/0129139 A1 | 6/2005 | Jones et al. | |
| 2005/0141459 A1 | 6/2005 | Li et al. | |
| 2005/0159187 A1 | 7/2005 | Mendolia et al. | |
| 2005/0231367 A1 | 10/2005 | Bellantoni | |
| 2005/0237953 A1 | 10/2005 | Carrender et al. | |
| 2005/0248456 A1 | 11/2005 | Britton et al. | |
| 2005/0271165 A1 | 12/2005 | Geraniotis et al. | |
| 2005/0280508 A1 | 12/2005 | Mravca et al. | |
| 2006/0019679 A1 | 1/2006 | Rappaport et al. | |
| 2006/0022800 A1 | 2/2006 | Krishna et al. | |
| 2006/0033609 A1 | 2/2006 | Bridgelall | |
| 2006/0044147 A1 | 3/2006 | Knox et al. | |
| 2006/0065731 A1 | 3/2006 | Powell et al. | |
| 2006/0094391 A1 | 5/2006 | Darabi | |
| 2006/0103576 A1 | 5/2006 | Mahmoud et al. | |
| 2006/0135211 A1 | 6/2006 | Chae et al. | |
| 2006/0170565 A1 | 8/2006 | Husak et al. | |
| 2006/0208080 A1 | 9/2006 | Overhultz et al. | |
| 2006/0224318 A1 | 10/2006 | Wilson et al. | |
| 2006/0279458 A1 | 12/2006 | Mohamadi | |

(56) References Cited

U.S. PATENT DOCUMENTS

| | | |
|---|---|---|
| 2006/0291544 A1 | 12/2006 | Fischer et al. |
| 2006/0291592 A1 | 12/2006 | Perrins et al. |
| 2007/0032241 A1 | 2/2007 | Busch et al. |
| 2007/0046467 A1 | 3/2007 | Chakraborty et al. |
| 2007/0127595 A1 | 6/2007 | Simon et al. |
| 2007/0149251 A1 | 6/2007 | Jeon |
| 2007/0176824 A1 | 8/2007 | Stumbo et al. |
| 2007/0187266 A1 | 8/2007 | Porter et al. |
| 2007/0219720 A1* | 9/2007 | Trepagnier ............ B60W 30/00 701/300 |
| 2008/0001735 A1 | 1/2008 | Tran |
| 2008/0012710 A1 | 1/2008 | Sadr |
| 2008/0030422 A1 | 2/2008 | Gevargiz et al. |
| 2008/0042847 A1 | 2/2008 | Hollister et al. |
| 2008/0061984 A1 | 3/2008 | Breed et al. |
| 2008/0068265 A1 | 3/2008 | Kalliola et al. |
| 2008/0143584 A1 | 6/2008 | Shoarinejad et al. |
| 2008/0186231 A1 | 8/2008 | Aljadeff et al. |
| 2008/0197982 A1 | 8/2008 | Sadr |
| 2008/0242240 A1 | 10/2008 | Rofougaran et al. |
| 2008/0258876 A1 | 10/2008 | Overhultz et al. |
| 2008/0318632 A1 | 12/2008 | Rofougaran et al. |
| 2009/0135800 A1 | 5/2009 | McPherson |
| 2009/0207947 A1 | 8/2009 | Strodtbeck et al. |
| 2010/0039228 A1 | 2/2010 | Sadr et al. |
| 2010/0069011 A1 | 3/2010 | Carrick et al. |
| 2010/0164805 A1 | 7/2010 | Niu et al. |
| 2010/0310019 A1 | 12/2010 | Sadr |
| 2011/0090059 A1 | 4/2011 | Sadr |
| 2011/0153208 A1* | 6/2011 | Kruglick ............... G01C 21/20 701/533 |
| 2011/0181422 A1 | 7/2011 | Tran et al. |
| 2011/0187600 A1 | 8/2011 | Landt |
| 2011/0205358 A1 | 8/2011 | Aota et al. |
| 2012/0086606 A1 | 4/2012 | Mathews et al. |
| 2012/0121161 A1 | 5/2012 | Eade et al. |
| 2012/0139704 A1 | 6/2012 | Sadr et al. |
| 2012/0275546 A1 | 11/2012 | Divsalar |
| 2013/0141220 A1 | 6/2013 | Sadr |
| 2013/0147608 A1 | 6/2013 | Sadr |
| 2013/0202062 A1 | 8/2013 | Sadr et al. |
| 2014/0197926 A1 | 7/2014 | Nikitin |
| 2014/0203914 A1 | 7/2014 | Sadr et al. |
| 2014/0218172 A1 | 8/2014 | Sadr |
| 2014/0292492 A1 | 10/2014 | Sadr |
| 2014/0292494 A1 | 10/2014 | Sadr et al. |
| 2015/0169909 A1 | 6/2015 | Sadr |
| 2015/0215073 A1 | 7/2015 | Sadr et al. |
| 2015/0326298 A1 | 11/2015 | Sadr et al. |
| 2015/0371067 A1 | 12/2015 | Sadr |
| 2016/0161590 A1 | 6/2016 | Sadr et al. |
| 2017/0308728 A1 | 10/2017 | Sadr et al. |

FOREIGN PATENT DOCUMENTS

| | | |
|---|---|---|
| EP | 3232414 A1 | 10/2017 |
| JP | 05142341 A | 6/1993 |
| JP | 1999066250 A | 3/1999 |
| JP | 2001148652 A | 5/2001 |
| JP | 2002098747 A | 4/2002 |
| JP | 2004094752 A | 3/2004 |
| JP | 2004194150 A | 7/2004 |
| JP | 2005136570 A | 5/2005 |
| JP | 2006284557 A | 10/2006 |
| JP | 2006293634 A | 10/2006 |
| JP | 2006318396 A | 11/2006 |
| JP | 2006324880 A | 11/2006 |
| JP | 2007121014 A | 5/2007 |
| JP | 2007327839 A | 12/2007 |
| WO | 9429990 A1 | 12/1994 |
| WO | 02065380 A2 | 8/2002 |
| WO | 2005101652 A1 | 10/2005 |
| WO | 2006011208 A1 | 2/2006 |
| WO | 2006026518 A2 | 3/2006 |
| WO | 2006075367 A1 | 7/2006 |
| WO | 2006099148 A1 | 9/2006 |
| WO | 2014151943 A1 | 9/2014 |

OTHER PUBLICATIONS

Extended European Search Report for European Application EP08732774.8,Report Completed Jul. 15, 2015, Mailed Jul. 23, 2015, 5 Pgs.

Extended European Search Report for European Application EP15164416.8,Report Completed Aug. 21, 2015, Mailed Aug. 31, 2015, 5 Pgs.

International Search Report and Written Opinion for International Application No. PCT/US2006/060339, filed Oct. 27, 2006, search completed Jul. 7, 2008, mailed Jul. 21, 2008, 5 pages.

International Search Report for International Application No. PCT/US2009/040584, date completed Jan. 7, 2010, date mailed Jan. 26, 2010, 4 pgs.

International Search Report for International Application PCT/US08/58061, Report completed Jun. 9, 2008, Report mailed Jun. 30, 2008, 3 pages.

Supplementary European Search Report for Application No. EP06850079, International Filing Date Oct. 27, 2006, Search Completed Dec. 12, 2013, 7 pgs.

Written Opinion for International Application No. PCT/2006/060339, filed Oct. 27, 2006, Opinion completed Jul. 17, 2008, mailed Jul. 21, 2008, 4 pgs.

Written Opinion of the International Searching Authority for International Application No. PCT/US2009/040584, date completed Jan. 7, 2010, date mailed Jan. 26, 2010, 5 pgs.

Written Opinion of the International Searching Authority for International Application PCT/US08/58061, Opinion completed Jun. 9, 2008, Opinion mailed Jun. 30, 2008, 6 pages.

International Search Report and Written Opinion for International Application PCT/US2014/026707, International Filing Date Mar. 13, 2014, Report Completed Jun. 28, 2014, Mailed Aug. 1, 2014, 6 pages.

Extended European Search Report for European Application EP07840315.1, Mailed Aug. 28, 2014, report completed Aug. 22, 2014, 5 Pgs.

"Apple Appears to Have Acquired GPS Firm Coherent Navigation [Confirmed]", retrieved from http://www.macrumors.com/2015/05/17/apple-coherent-navigation-acquisition/ on May 18, 2015, 16 pgs.

"Simultaneous Localization and Mapping (SLAM)", Retrieved from https://www.usna.edu/Users/cs/taylor/courses/si475/class/slam.pdf on Nov. 10, 2014, 3 pgs.

Beevers, Kristopher R. et al., "Fixed-lag Sampling Strategies for Particle Filtering SLAM", 2007 IEEE International Conference on Robotics and Automation, Apr. 10-14, 2007, 6 pgs.

Chevillat et al., "Decoding of Trellis-Encoded Signals in the Presence of Intersymbol Interference and Noise", IEEE Transactions on Communications, 1989, vol. 37, No. 7, pp. 669-676.

Divsalar et al., "Multiple-Symbol Differential Detection of MPSK", IEEE Transactions on Communications, Mar. 1990, vol. 38, No. 3, pp. 300-308.

Eade, Ethan et al., "Monocular Graph SLAM with Complexity Reduction", 2010 IEEE/RSJ International Conference on Intelligent Robots and Systems Oct. 18-22, 2010, Taipei, Taiwan, pp. 3017-3024.

EPCGLOBAL, "EPC standard", Published Jan. 26, 2005, 94 pgs.

Forney, Jr., "Maximum-Likelihood Sequence Estimation of Digital Sequences in the Presence of Intersymbol Interference", IEEE Transactions on Information Theory, May 1972, vol. IT-18, No. 3, pp. 363-378.

Howard, Andrew, "Multi-robot Simultaneous Localization and Mapping using Particle Filters", In Robotics: Science and Systems, 2005, pp. 1-8.

Huang, Joseph et al., "Efficient, Generalized Indoor WiFi GraphSLAM", IEEE International Conference on Robotics and Automation, Sep. 13, 2010, 6 pgs.

(56) References Cited

OTHER PUBLICATIONS

Kerpez, "Viterbi Receivers in the Presence of Severe Intersymbol Interference", IEEE Xplore, downloaded on Jan. 21, 2009, pp. 2009-2013.

Makrakis et al., "Optimal Noncoherent Detection of PSK Signals", IEEE Electronics Letters, Mar. 15, 1990, vol. 26, No. 6, pp. 398-400.

Montemerlo, Michael, "FastSLAM: A Factored Solution to the Simultaneous Localization and Mapping Problem", In Proceedings of the AAAI National Conference on Artificial Intelligence, 2002, 6 pgs.

Mudumbai, R. et al., "Scalable Feedback Control for Distributed Beamforming in Sensor Networks," Proc. 2005 IEEE International Symposium on Information Theory (ISIT 2005), Sep. 2005.

Sadr et al., "Generalized Minimum Shift-Keying Modulation Techniques", IEEE Transactions on Communications, Jan. 1988, vol. 36, No. 1, pp. 32-40.

Taniguchi et al., Kentaro, "Indoor Positioning via TDOA measurements Using Particle Filter", IEICE Technical Report, RCS2005-227, vol. 105, No. 623, The Institute of Electronics, Information and Communication Engineers, Feb. 22, 2006, pp. 295 to 300.

Thrun, Sebastian E., "Multi-Robot SLAM with Sparse Extended Information Filters", Department of Computer Science, Stanford University, Stanford, CA 2 Department of Physics, Carnegie Mellon University University, Pittsburgh, PA, Jul. 29, 2014, 12 pgs.

Widrow, Bernard et al., "A Comparison of Adaptive Algorithms Based on the Methods of Steepest Descent and Random Search," IEEE Transactions on Antennas and Propagation, vol. 24, No. 5, pp. 615-637, Sep. 1976.

Extended European Search Report for European Application No. 09763070.1, Completed May 18, 2012, dated May 30, 2012, 10 Pgs.

Extended European Search Report for European Application No. 14767719.9, completed Sep 12, 2016, dated Sep. 19, 2016, 8 Pgs.

International Preliminary Report on Patentability for International Application PCT/US2014/026707, Report Issued Sep. 15, 2015, dated Sep. 24, 2015, 5 Pgs.

International Preliminary Report on Patentability for International Application PCT/US2007/072423, Completed Jan. 13, 2009, 13 pages.

International Preliminary Report on Patentability for International Application PCT/US2009/040584, completed Nov. 5, 2009, dated Apr. 25, 2011, 8 Pgs.

International Preliminary Report on Patentability for International Application PCT/US2009/040584, dated Oct. 19, 2010, 6 Pgs.

Extended European Search Report for European Application No. 16002642.3, Search completed Sep. 8, 2017, dated Sep. 18, 2017, 8 Pgs.

\* cited by examiner

1200

Hidden Markov Model State Machine $$\begin{bmatrix} \tau^s & \tau^n \\ \tau^d & \tau^s \end{bmatrix} \quad \det = (\tau^s)^2 - \tau^d \cdot \tau^n$$

Reduced Two State Markov Machine Matrix

LOCATION BASED SERVICES FOR RFID AND SENSOR NETWORKS

CROSS-REFERENCE TO RELATED APPLICATIONS

The present application claims priority under 35 U.S.C. § 119(e) to U.S. Provisional Patent Application Ser. No. 62/152,713 entitled "Location Based Services for RFID and Sensor Networks", filed Apr. 24, 2015, the disclosure of which is hereby incorporated by reference in its entirety.

FIELD OF THE INVENTION

The present invention relates generally to determining the location of radio-frequency identification tagged assets and more specifically to estimating location using location information collected from assets having sensors.

BACKGROUND

Today, passive radio-frequency identification (RFID) tags are widely used for real-time location systems (RTLS) in tracking goods, assets and people. An RTLS typically outputs the location of each sensor or RFID tag with three coordinates relative to a fixed known position of the RFID/sensor reader.

In a fixed reader infrastructure in indoor environments such as warehouses, distribution centers, or retail stores, the coordinates of each reader, excitation node and associated antennas are typically manually measured and individually input to the system by a human operator when initially configuring the system. RFID systems can also include mobile RFID readers. Mobile RFID readers can be handheld units operated by humans, robots, or drones equipped with an embedded RFID reader. In mobile applications, the position of the reader varies when the reader is moved for the purpose of covering different regions in a physical area.

SUMMARY OF THE INVENTION

Systems and methods for generating sensor tag locations expressed in a three-dimension global coordinate system from sensor tag locations expressed in three-dimensional local coordinate systems of mobile readers that read each tag and for updating the paths of each mobile reader are disclosed. In one embodiment, a method includes receiving sensor data from one or more mobile reader agents, receiving tag location data that describes the location of one or more sensor tags expressed in local coordinates of the subspace of the mobile reader agent that read the sensor tag, converting the tag location data into a global coordinate system that is common to all mobile reader agents, and updating one or more paths of one or more mobile reader agents to increase the coverage of reading tags in the subspace of the mobile reader agent.

In a further embodiment, sensor data includes information from an accelerometer, a magnetometer, a gyroscope, and the position of an antenna that are on-board a mobile reader agent.

In another embodiment, the one or more mobile reader agents are configured to roam distinct non-overlapping subspaces within a read area.

A still further embodiment includes receiving reference location data that is obtained from at least one anchor node, where the anchor node has a known location in global coordinates.

In still another embodiment, control of the mobile reader agent is provided via proportional integral derivative (PID) control.

In a yet further embodiment, updating one or more paths of one or more mobile reader agents to increase the coverage of reading tags in the subspace of the mobile reader agent includes receiving obstacle data concerning agents and people in the read area.

In yet another embodiment, converting the tag location data into a global coordinate system that is common to all mobile reader agents includes expressing the sensor data in quaternions and using quaternion algebra to rotate the matrix.

In a further embodiment again, updating one or more paths of one or more mobile reader agents to increase the coverage of reading tags in the subspace of the mobile reader agent includes computing a path for a mobile reader agent around obstacles that are expressed in the form: $x_{obs}^{i} = \{\underline{x} \in X | A^i(x^i) \cap 0 \neq \emptyset\}$ and $x_{obs}^{ij} = \{\underline{x} \in X | A^i(x^i) \cap A^j(x^j) \neq \emptyset\}$ where $$x_{obs} = \left(\bigcup_{i=1}^{m} x_{obs}^{i}\right) \cup \left(\bigcup_{\substack{i \neq j \\ i,j}} x_{obs}^{ij}\right).$$

In another embodiment again, the tag location data that describes the location of one or more sensor tags expressed in local coordinates of the subspace of the mobile reader agent that read the sensor tag is expressed as a quaternion in the form: $q = q_0 + q_1 i + q_2 j + q_3 k$, where i, j, and k are imaginary numbers satisfying $i^2 = j^2 = k^2 = ijk = -1$ with conjugate $q^c = q_0 - q_1 i - q_2 j - q_3 k$ and $|q|^2 = qq^c$.

In a further additional embodiment, converting the tag location data into a global coordinate system that is common to all mobile reader agents includes rotating the quaternion using a rotation matrix that is expressed as:

$$R(q) = \begin{bmatrix} -q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix}.$$

In another additional embodiment, a sensor tag reader and location system for generating sensor tag locations expressed in a three-dimension global coordinate system from sensor tag locations expressed in three-dimensional local coordinate systems of mobile readers that read each tag and for updating the paths of each mobile reader includes a processor and memory that includes an inventory and agent control application, where the processor is configured by the inventory and agent control application to receive sensor data from one or more mobile reader agents, receive tag location data that describes the location of one or more sensor tags expressed in local coordinates of the subspace of the mobile reader agent that read the sensor tag, convert the tag location data into a global coordinate system that is common to all mobile reader agents, and update one or more paths of one or more mobile reader agents to increase the coverage of reading tags in the subspace of the mobile reader agent.

In a still yet further embodiment, sensor data includes information from an accelerometer, a magnetometer, a gyroscope, and the position of an antenna that are on-board a mobile reader agent.

In still yet another embodiment, the one or more mobile reader agents are configured to roam distinct non-overlapping subspaces within a read area.

In a still further embodiment again, the processor is further configured by the inventory and agent control application to receive reference location data that is obtained from at least one anchor node, where the anchor node has a known location in global coordinates.

In still another additional embodiment, control of the mobile reader agent is provided via proportional integral derivative (PID) control.

In still another embodiment again, the processor being configured to update one or more paths of one or more mobile reader agents to increase the coverage of reading tags in the subspace of the mobile reader agent includes the processor being configured to receive obstacle data concerning agents and people in the read area.

In a still further additional embodiment, the processor being configured to convert the tag location data into a global coordinate system that is common to all mobile reader agents includes the processor being configured to express the sensor data in quaternions and using quaternion algebra to rotate the matrix.

In a yet further embodiment again, the processor being configured to update one or more paths of one or more mobile reader agents to increase the coverage of reading tags in the subspace of the mobile reader agent includes the processor being configured to compute a path for a mobile reader agent around obstacles that are expressed in the form:
$x_{obs}^{i} = \{\underline{x} \in X | A^i(x^i) \cap 0 \neq \emptyset\}$ and
$x_{obs}^{ij} = \{\underline{x} \in X | A^i(x^i) \cap A^j(x^j) \neq \emptyset\}$ where $$x_{obs} = \left(\bigcup_{i=1}^{m} x_{obs}^{i}\right) \cup \left(\bigcup_{\substack{i \neq j \\ i,j}} x_{obs}^{ij}\right).$$

In yet another embodiment again, the tag location data that describes the location of one or more sensor tags expressed in local coordinates of the subspace of the mobile reader agent that read the sensor tag is expressed as a quaternion in the form: $\underline{q} = q_0 + q_1 i + q_2 j + q_3 k$, where i, j, and k are imaginary numbers satisfying $i^2 = j^2 = k^2 = ijk = -1$ with conjugate $\underline{q}^z = q_0 - q_1 i - q_2 j - q_3 k$ and $|\underline{q}|^2 = \underline{q}\underline{q}^c$.

In a yet further additional embodiment, the processor being configured to convert the tag location data into a global coordinate system that is common to all mobile reader agents includes the processor being configured to rotate the quaternion using a rotation matrix that is expressed as:

$$R(\underline{q}) = \begin{bmatrix} -q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{bmatrix}.$$

DETAILED DISCLOSURE OF THE INVENTION

Figure 1:
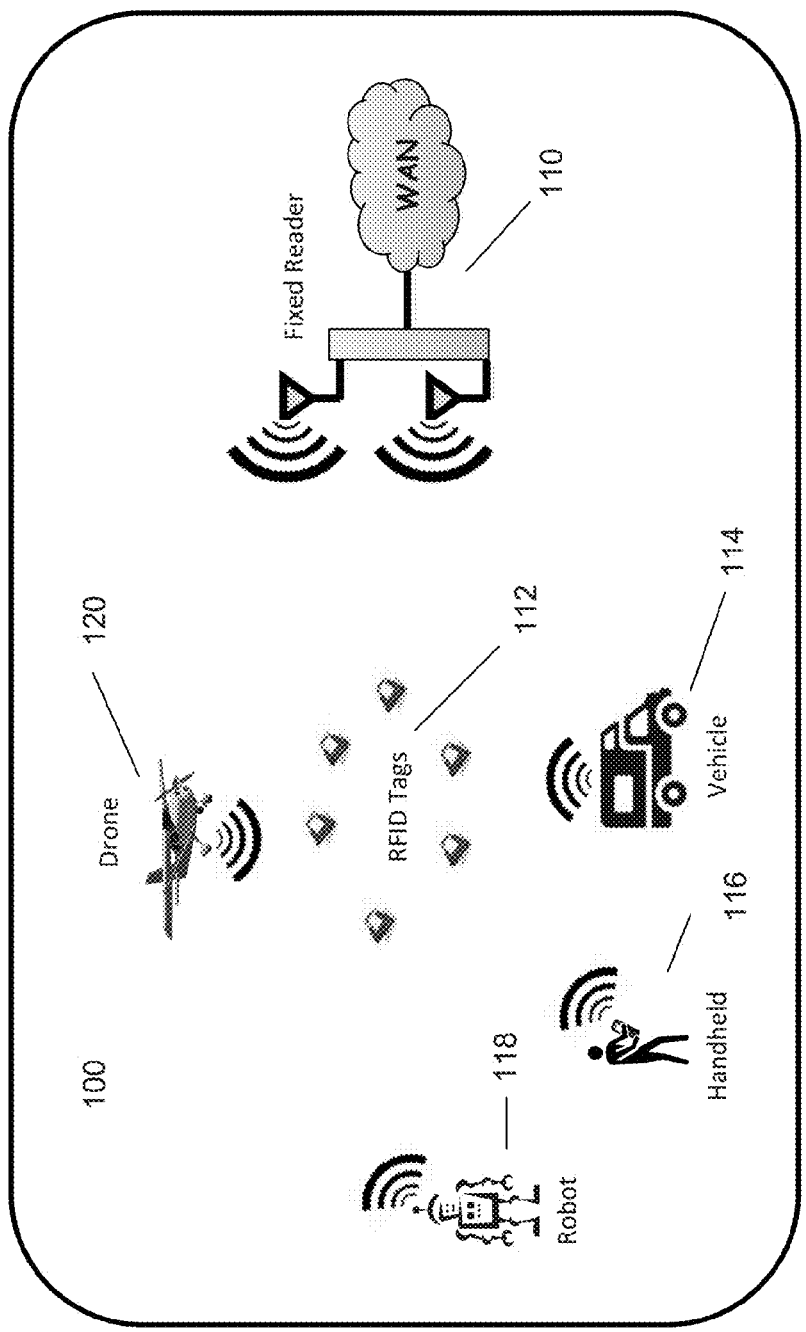
FIG. 1 is a system level overview illustrating an RFID reader system in accordance with embodiments of the invention.

Systems and methods for establishing geographic location information in RFID and sensor networks in accordance with embodiments of the invention are disclosed. In many indoor environments, global positioning system (GPS) signals are not available due to fundamental limitations of GPS signal propagation through building walls and ceilings. Measuring accurate location is a fundamental challenge in indoor environments. In many embodiments, a geographic information system combines multiple location information sources to determine a position of an RFID reader system. The geographic position of the reader system can be used to establish the geographic location of each asset identified by the RFID reader system. Location information streams can include, but are not limited to, global positioning system (GPS), sensors, passive or active radio frequency identification (RFID) tags, and wide area location data and real-time kinematics services. In many embodiments of the invention, the assets are equipped with sensors that generate location information and/or RFID tags.

An RTLS system output vector for the location of each asset can be expressed as the measured coordinates $(x, y, z) \in \mathbb{R}^3$, the three dimensional Euclidean space representation of longitude, latitude and elevation. In many embodiments of the invention, a location fusion engine performs location estimates by combining external reference location data streams with the measured locations $(x, y, z)$ to generate representations of terrestrial geographic coordinates of each tagged RFID/sensor unit read by the reader system. A location fusion engine may be a component of the RFID reader system or may be an auxiliary system.

With the emergence of wide area location services, it is envisioned that each reader and fixed antenna can be equipped with a device to listen and use the wide area location radio or terrestrial service to establish its own location and report it to the reader system. With the emergence of a wide array of new sensors such as gyroscopes, accelerometers and pressure sensors, it is advantageous to further leverage the information from all sensor types to more accurately establish and track the location of an object, provided that the object is using an RFID tag or a sensor that is available to be queried with its identification code. The RTLS system can subsequently measure the characteristic of the received signal from each tagged asset and estimate a relative position of each asset to the position of the reader system, with the reader system being at the center of the coordinate system.

Geographic location estimation systems in accordance with many embodiments of the invention are able to eliminate stray reads in localization of RFID tags. An unintended consequence of reading sensors/RFID tags in an area can be reading other tags in the vicinity of the reader system that are not desired. With accurate measurement of the location of each reader/excitation point, it is possible to reject stray reads.

In several embodiments of the invention, a geographic location estimation system can transform coordinates to Universal Transverse Mercator (UTM) or Universal Polar Stereographic coordinates and make geodetic height available for use by geographic information systems (GIS).

In additional embodiments of the invention, a geographic location estimation system provides real-time availability of asset location for a user interface on a GIS system that can be used in compliance with specific standards to deliver location aware applications and for data mining and analytics for supply chain management, worker safety and a wide variety of use cases using sensor and RFID technology for location tracking.

Mobile readers in accordance with embodiments of the invention can include miniaturized robotics and drone technology for taking inventory of RFID tagged goods and monitoring sensor fields. A class of mobile readers that are semi-autonomous vehicles, such as, but not limited to, drones and robots, may be referred to as "agents." Several embodiments of the invention provide the ability to track multiple "agents" (e.g., drones or robots) and navigate them in fairly tight spacing in environments such as a retail store or factory while reading and locating tags. Potential applications in accordance with embodiments of the invention provide autonomous navigation of these agents safely and accurately in real-life deployment. Many embodiments include reliable wireless links to communicate with each agent device. The overall network of these agent devices as sensors in accordance with several embodiments of the invention is illustrated in FIG. 1.

Many embodiments utilize an accurate position for each agent in three-dimensional Euclidean space, namely longitude, latitude and elevation/attitude. In the application of inventory counting using passive RFID, reads of RFID tags may be more effective when the radiating antenna is able to tilt and move to align the bore-sight of the antenna with the target area to be inventoried. In several embodiments, each agent is able to move freely in open space in all three dimensions to reach various locations and heights to take proper inventory and position of all the tagged items. Further embodiments include the assistance of multi-modal sensors, such as way-points or anchors having known locations. These can be via visual cues such as (but not limited to) optical LEDs, two dimensional bar codes or wireless bluetooth or WiFi devices that broadcast their position.

The estimation of attitude of each sensor and agent presents a particular challenge in-indoor applications, even when different types of sensors, such as pressure, magnetometer and others are used. For example pressure sensors can be highly noisy in the presence of an air conditioning system.

Many embodiments of the invention include "anchor nodes" as discussed earlier with known relative attitudes between pairs of anchors. These can be used in retrieving or knowing the reference position from an Euclidean distance matrix even if it is incomplete and noisy. Principal applications can include motion capture and vectorial waves measurement. In other embodiments, any of a variety of processes and/or combinations of processes can be utilized as appropriate to the requirements of a given application.

Navigation of each agent can assume a known kinematics, position vector for center of gravity and antenna elevation of each agent in the local coordinate system of the agent itself, which is communicated to the central processing unit or server. A central server, such as the server shown in FIG. 1, can process this data and perform path planning across the physical area to complete the underlying task in an efficient and/or optimal fashion, for example finding the shortest time (or a path that satisfies a time and/or other criterion) for multiple drones to fly through a retail store and perform a "cycle count" across one or many floors, while minimizing contention or collision.

In several embodiments, a process utilizing quaternion algebra is adopted for three-dimensional positioning of the radiating antenna of agents and to enable matrix algebra for solving the underlying problem to conveniently represent rotations and orientations in three dimensions. Quaternions encode spatial rotational information with representation in four numbers, representing a point relative to the origin in $\mathbb{R}^3$.

Additional embodiments can include the polarization dimension of each agent's radiating antenna. The approach can be extended by employing Grassmann algebra to support additional dimensions beyond three dimensions. Processes that utilize this mathematical framework in the representation of spatial information can enable translations of different local coordinate systems into a global coordinate system by simple rotations with quaternion algebra or tensor metrics when Grassmann algebra is adopted.

Systems for Determining Geographic Location Information

Geographic location estimation systems in accordance with many embodiments of the invention may include hardware and appropriate software or other embedded instructions that configure each piece of hardware to execute the instructions. Basic systems for reading RFID tags include at least an RFID reader system and RFID tags that may be attached to assets. A system for reading RFID tags that may be utilized in accordance with an embodiment of the invention is illustrated in FIG. 1. The system 100 includes at least one RFID reader system 110 and at least one RFID tag 112. The system may include RFID reader systems that are fixed 110 (in a static location) or mobile (moving or in motion at least part of the time). Mobile RFID reader systems may include, but are not limited to, a vehicle based reader 114, handheld reader 116 (such as on a mobile device or phone), robot 118, and/or drone 120.

Figure 2:
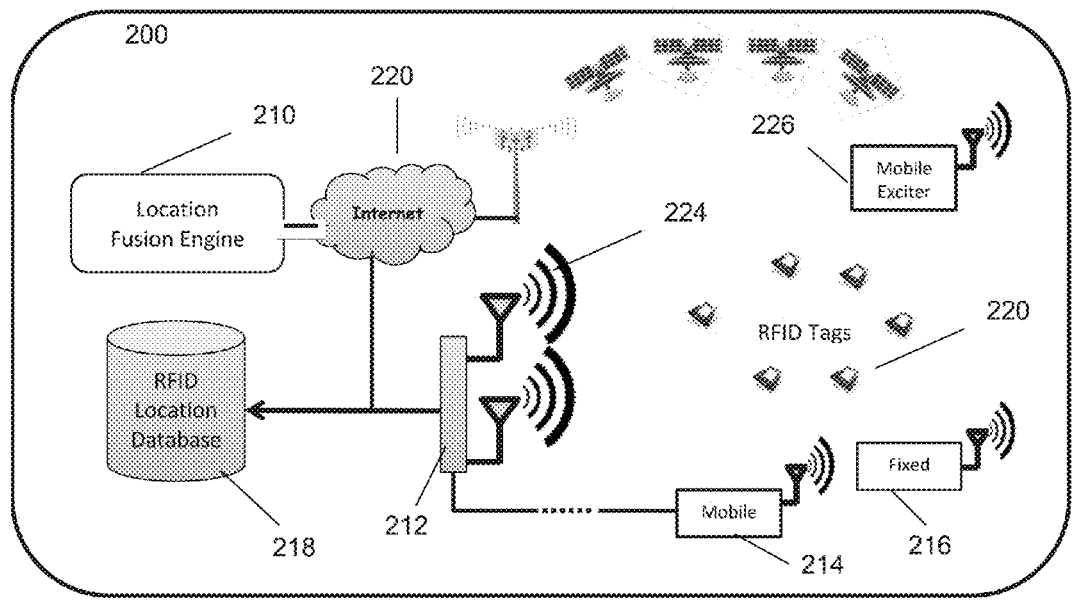
FIG. 2 is a system level overview illustrating an RFID location estimation system in accordance with embodiments of the invention.

More advanced systems may be configured to collect location information and generate location estimates. A geographic location estimation system for generating location estimates in accordance with embodiments of the invention is illustrated in FIG. 2. The geographic location estimation system 200 may include a location fusion engine 210, one or more RFID reader systems 212, 214, 216, one or more RFID location databases 218, and one or more RFID tags 220. RFID tags 220 may be attached to fixed or mobile assets. One or more elements of the system 200 such as antenna 224, reader 212, and/or RFID tag 220 may be configured to obtain reference location data indicative of its position to a very high precision. In several embodiments, reference location data can be obtained using a real time location system (RTLS) receiver. In some embodiments, RTLS receivers can obtain reference location data that provides location information to an accuracy of several centimeters or even several millimeters and/or within an indoor environment where global positioning system (GPS) signals may be unavailable. As will be discussed further below, RFID reader systems may also be configured to obtain the locations of RFID tags using the backscattered signals received from the tags. This location information generated from the backscattered signals may be processed with reference location data to refine locations of tags and/or other assets to a higher accuracy.

The location fusion engine 210, RFID reader system(s) 212, 214, 216, and RFID location database 218 may communicate over a local or wide area network such as the Internet 222. In some embodiments, the location database 218 may be local to the location fusion engine 210 and have direct lines of communication. The location fusion engine 210 may be configured by a location fusion application stored in memory to receive geographic information from RFID reader system(s) and/or other sensors that generate geographic information and to generate location estimates for one or more RFID reader system(s) and/or assets using the geographic information. Processes for generating location estimates in accordance with embodiments of the invention are discussed further below.

RFID reader systems may be fixed 216 (in a static location) or mobile 214 (moving or in motion at least part of the time). RFID reader systems may include one or more antennas 224. In some embodiments of the invention, at least one reader system both transmits RFID tag interrogation signals and receives backscattered signals transmitted from RFID tags in response to the interrogation signals. In other embodiments, at least one RFID reader system is implemented in a distributed architecture having a reader 212 in communication with one or more remote exciters 226. In several such embodiments, one or more exciters 226 are provided with an interrogation signal or information which can be used to generate an interrogation signal. The exciter(s) 226 illuminates its interrogation space with the interrogation signal(s) and one or more RFID readers 212 receive backscattered signals transmitted from RFID tags in response to the interrogation signal(s). In still additional embodiments, readers and/or exciters utilize multiple antennas, where each of the antennas may transmit, receive, or both transmit and receive. In various embodiments where a reader system both transmits and receives signals or where an exciter transmits signals and a reader receives signals as discussed above, one or more received signals may be utilized to determine the location of an RFID tag that transmitted the signal. Location can be determined from information such as, but not limited to, range/distance of an RFID tag to a transmitting antenna calculated from phase differences in signals backscattered from signals having different frequencies, direction of arrival of one or more signals, and/or other information.

RFID reader systems that may be utilized in accordance with embodiments of the invention to transmit and receive signals from RFID tags are disclosed in U.S. Pat. Nos. 8,395,482, 8,680,970, and U.S. Patent Publication No. 2014/0292494 entitled RFID Systems Using Distributed Exciter Network, U.S. Pat. No. 8,400,271 entitled RFID receiver, U.S. Pat. No. 8,941,472 entitled Methods for Recovering RFID Data Based Upon Probability Using an RFID Receiver, and U.S. Pat. Nos. 8,768,248 and 9,014,635 entitled RFID Beam Forming System, the relevant disclosure from which are hereby incorporated by reference in their entireties. RFID reader systems that may be utilized to determine locations of RFID tags using received signals in accordance with embodiments of the invention are disclosed in U.S. Pat. Nos. 8,072,311, 8,629,762, and U.S. Patent Publication No. 2014/0203914 entitled Radio Frequency Identification Tag Location Estimation and Tracking System and Method, the relevant disclosures from which are hereby incorporated by reference in their entireties.

Figure 3:
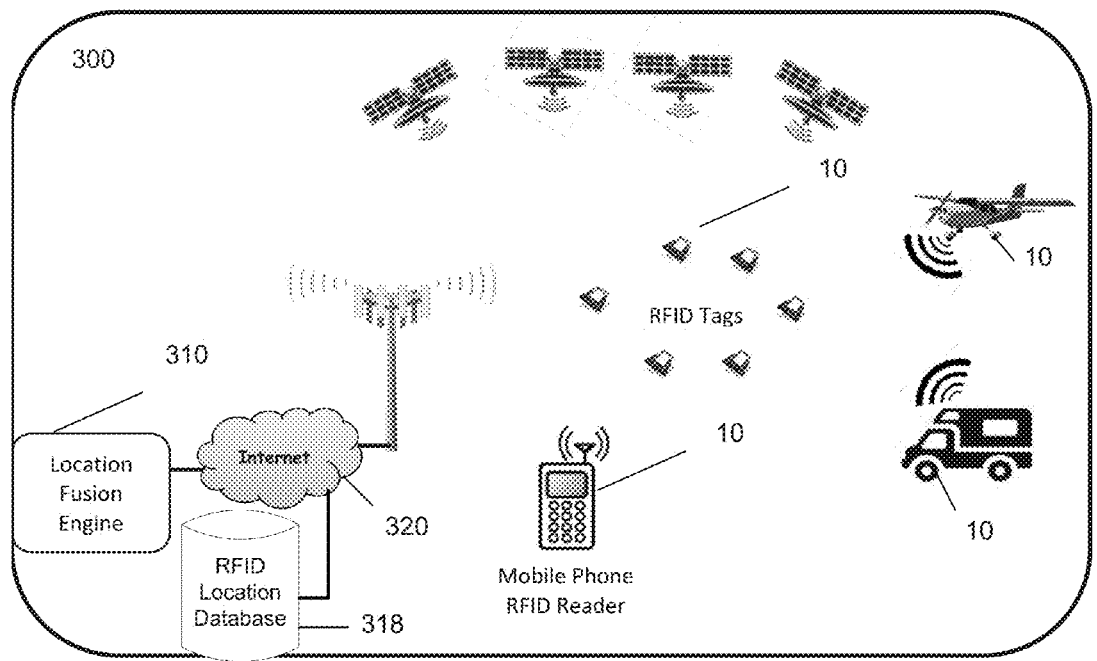
FIG. 3 is a system level overview illustrating an RFID location estimation system that includes mobile RFID reader systems in accordance with embodiments of the invention.

In several embodiments of the invention, mobile readers are installed on handheld devices and/or vehicles. An RFID reader system including mobile readers in accordance with embodiments of the invention is illustrated in FIG. 3. The RFID reader system 300 includes a location fusion engine 310, mobile phone RFID reader 312, automobile based RFID reader 314, airplane based RFID reader 316, and one or more RFID location databases 318. The location fusion engine 310, RFID readers 312, 314, 316, and one or more RFID location databases 318 may communicate over a local or wide area network such as the Internet 320. In some embodiments, the location database 318 may be local to the location fusion engine 310 and have direct lines of communication. As in the system illustrated in FIG. 2 above, one or more elements, such as readers, RFID tags, or other assets may be equipped with RTLS receivers.

Figure 4A:
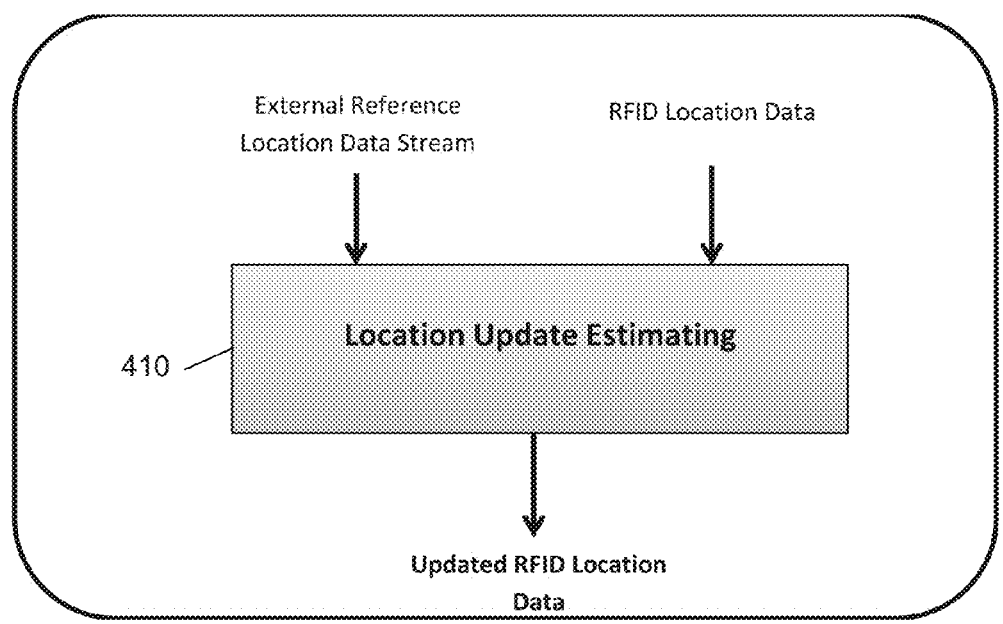
FIGS. 4A and 4B conceptually illustrate systems for performing location estimation in accordance with embodiments of the invention.
Figure 4B:
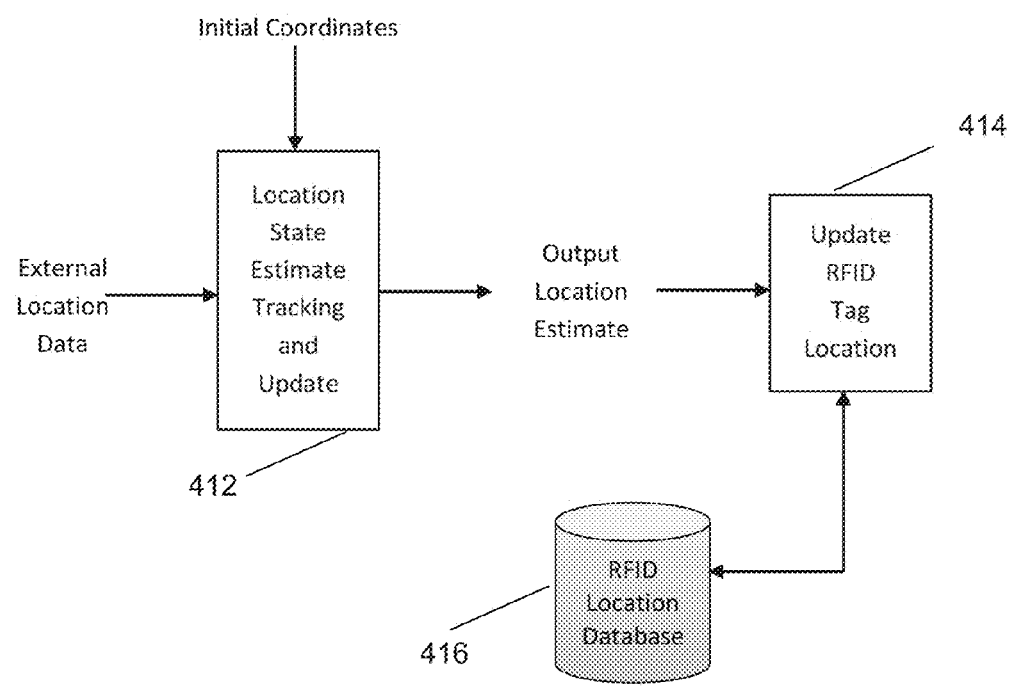

FIGS. 4A and 4B conceptually illustrate systems for performing location estimation in accordance with embodiments of the invention. Location fusion engine 400 illustrated in FIG. 4A receives at least one external reference location data stream and RFID location data and generates updated RFID location data. Location fusion engine 410 illustrated in FIG. 4B similarly receives at least one external location data stream and a set of initial coordinates, generates an output location estimate, updates 420 RFID tag locations and enters the updated locations in RFID location database 430. Processes for updating location data in accordance with various embodiments of the invention are discussed below.

Although geographic location estimation systems including specific hardware and software in accordance with several embodiments of the invention are discussed above, one skilled in the art will recognize that any of a variety of hardware and software may be utilized for collecting and processing location information in accordance with embodiments of the invention.

Processes for Determining Geographic Location Information

Figure 5:
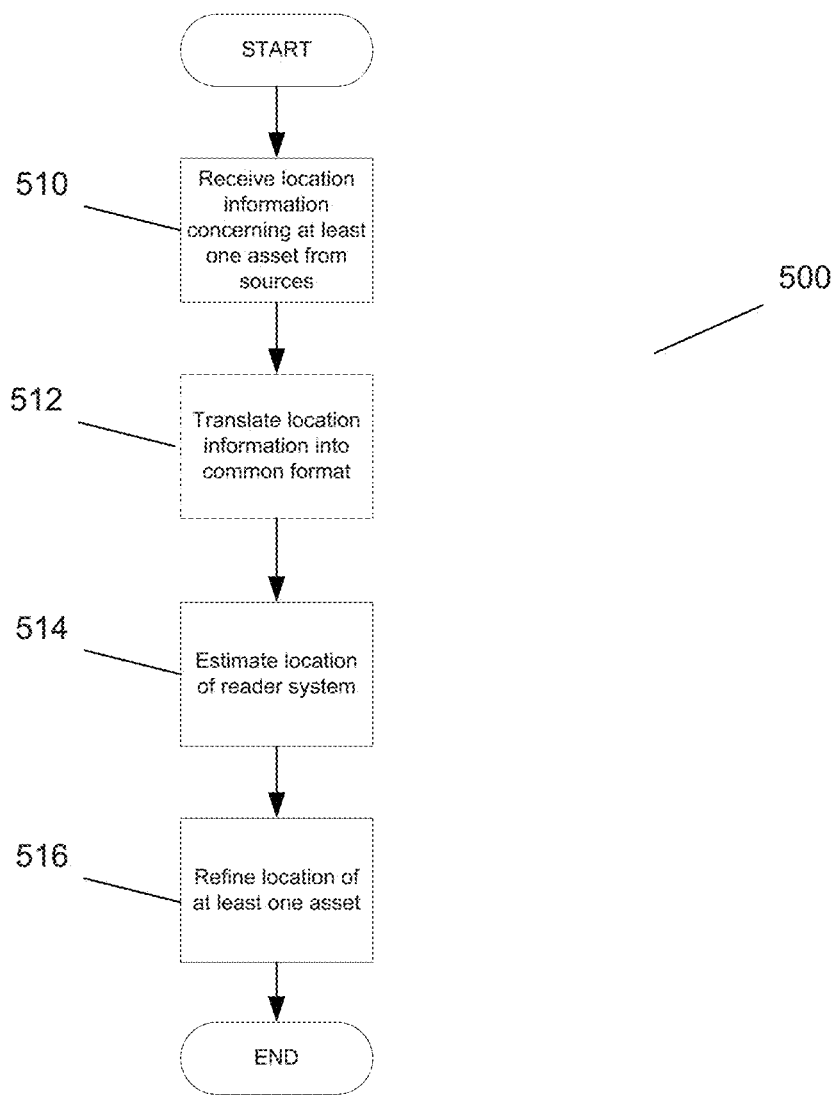
FIG. 5 is a flow chart illustrating a process for generating location estimates in accordance with embodiments of the invention.

In many embodiments of the invention, a geographic location estimation system includes a location fusion engine configured to perform a process to collect geographic location information, determine initial location estimates, and refine the location estimates. In several embodiments, a geographic location estimation system can determine positioning data for RFID tagged assets and refine the position using a location fusion engine. In this way, some embodiments of the invention enable the geographical location error for each asset to be bounded by the error of the RTLS system(s) used in locating each asset. A process for generating location estimates in accordance with embodiments of the invention is illustrated in FIG. 5.

The process 500 includes receiving (510) location information concerning at least one asset from sources of location information. Different types of sources and harmonizing the information from the sources are discussed in greater detail further below. As will be discussed further below, location information can be expressed as a vector for each location.

The location information can be translated or converted (512) into a common format. As will be discussed in great detail further below, location information of assets may be acquired at different sampling rates, and/or be represented in different measurement units and/or coordinate systems. To facilitate processing, the pieces of location information for different assets may be translated into a common format.

The location fusion engine can utilize the location information to generate (514) an estimated location of the RFID system and refine (516) the locations of at least one asset. RFID reader systems that may be utilized to determine locations of RFID tags using received signals in accordance with embodiments of the invention are disclosed in U.S. Pat. Nos. 8,072,311, 8,629,762, and U.S. Patent Publication No. 2014/0203914 entitled Radio Frequency Identification Tag Location Estimation and Tracking System and Method, incorporated by reference further above. As discussed further above, reference location data may precisely identify the locations of antennas, readers, tags, and/or other assets to a high degree of accuracy in many embodiments of the invention. This enables location information that may be less accurate (or with greater error or deviation), such as those obtained that may be obtained by readers using backscattered signals from tags, to be refined to be more precisely located in three-dimensions, particularly when using mobile reader infrastructure where the location of antennas may otherwise be unknown or known with low precision. Techniques such as those discussed below may be utilized to refine location information using reference location data. Although a specific process for generating geographic location information is described above, one skilled in the art will recognize that any of a variety of processes may be utilized in accordance with embodiments of the invention. Various techniques for generating location estimates using statistical models in accordance with embodiments of the invention are discussed further below.

Location Fusion

Accurately determining the location of an asset can be difficult when GPS signals are not available or when the precision of available GPS signals is not satisfactory. In many embodiments of the invention, additional measurement sources can be employed to enhance and/or assist in establishing the location of an asset. Composite location information can be formed using public or private infrastructure that continuously broadcasts location information over a wide area in urban and rural areas, in addition to multimodal sensor sources such as, but not limited to: wide area wireless radio network for location systems; location information from WIFI or cellular networks; pressure sensors to measure elevation; measurement from a gyroscope for measuring orientation via angular measurements; accelerometer to track velocity and acceleration; and compass (magnetometer) to establish heading and direction in reference to the North Pole.

Figure 6:
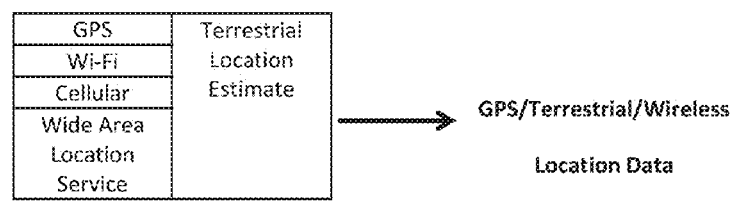
FIG. 6 illustrates various location information sources that can generate a terrestrial location estimate in accordance with embodiments of the invention.

FIG. 6 illustrates various location information sources that can generate a terrestrial location estimate in accordance with various embodiments of the invention. Sources can include, but are not limited to, GPS, Wi-Fi, cellular network information, and/or wide area location services. Sources such as gyroscopes, accelerometers, and compasses that generate "motion" type data or data regarding movement, which may involve tracking, are discussed further below. One skilled in the art will recognize that various other information sources can be used to supplement location information as appropriate to any particular application in accordance with embodiments of the invention.

Measurements representing location information received by a location fusion engine can be modeled by a random vector $r_n \in \Omega = \{r_n : r_n \in \mathbb{R}^k, n \in \mathbb{Z}\}$ of size k which is the number of sources providing location information to the system and where n is time index. The vector may be processed and translated into common absolute coordinate units (x,y,z), and the vector measurement can be denoted as:

$$u_n = (u_n^1 u_n^2 \ldots u_n^j)$$

where each element of the vector embeds a "coordinate" vector, that is $$u_n^j = \begin{pmatrix} x_j \\ y_j \\ z_j \end{pmatrix},$$

x denotes the longitude, y the latitude, and z the elevation and the index j the j-th sensor. The location for each asset can be denoted as the vector:
$v_n = (v_n^1 v_n^2 \ldots v_n^Q)$, with $$v_n^j = \begin{pmatrix} x_j \\ y_j \\ z_j \end{pmatrix}_{\Omega = \{r_n : r_n \in \mathbb{R}^k, n \in \mathbb{Z}\}}$$

Further, {$\Omega$, F, P) can be defined, where g denotes the σ-algebra induced over $\Omega$, P denotes the probability measure on F, and Q represents the number of assets equipped with sensors within the field of vision or range of the reader or excitation node.

Sensor Signal Reconstruction Using Filter Banks

In many embodiments of the invention, location information received from sensors may have been sampled at different rates and/or be represented in different measurement units and/or coordinate systems.

In order to accommodate a wide choice of sensor data streams from different sensor types ranging from GPS to accelerometer to WIFI and Bluetooth measurements, a geographic location estimation system can be configured to translate and equalize the observed value from each sensor type. That is, each element of vector r may be interpolated into a common sampling rate, which is at least twice the Nyquist rate with respect to the sensor stream with the highest update rate. Sensor bandwidth can vary from different types and may operate in polled mode and observed at constant blink rate. WAN location services bandwidth is typically a network feature choice with trade-off between cost and availability. Due to variability of data streams from each sensor in terms of bandwidth and measurement type, all the sensor streams may also be scaled and converted to a common location measurement unit (e.g. cm, feet) and mapped to a representation in longitude, latitude and elevation. A data conversion engine for converting sensor input to common scale and unit in accordance with embodiments of the invention in FIG. 7. The data conversion engine 710 receives location information from Wi-Fi, GPS, cellular, and/or wide area location estimation sensors and provides converted location information to location fusion engine 720.

Figure 8:
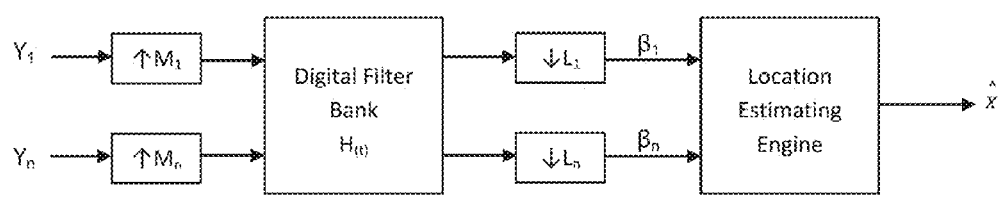
FIG. 8 conceptually illustrates a digital filter bank for sampling rate conversion of location information signals in accordance with embodiments of the invention.

In many embodiments of the invention, for synchronous sensor streams, the sampling rate conversion can be performed using a digital filter bank as illustrated in FIG. 8. It can assumed that each element of the vector r is mutually independent as the measurement from one sensor type or location service is typically independent from the measurement from another source, that is, $r_i \cap r_j = \emptyset \forall i \neq j$, i,j$\in$Z. This observation allows each sensor stream to be treated independently with a single chain of digital filters.

Figure 9:
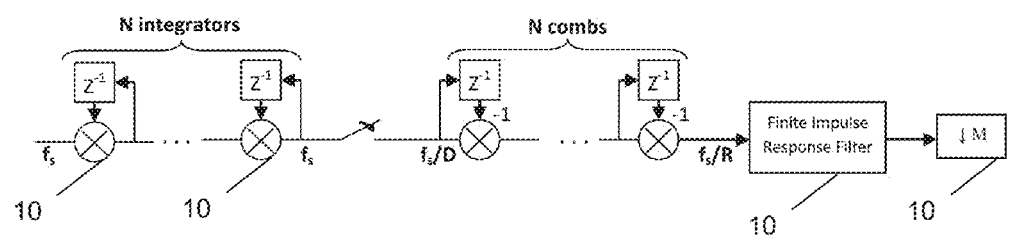
FIG. 9 conceptually illustrates a cascaded integrated comb (CIC) filter preceding a finite impulse response (FIR) filter for converting sampling rates in accordance with embodiments of the invention.

In several embodiments, a computationally efficient and flexible option to support a variety of sensor update rates by different sensor types is possible by employing a cascaded integrated comb (CIC) filter preceding a finite impulse response (FIR) filter as illustrated in FIG. 9. The overall transfer function of the CIC filter is $$H_{CIC}(z) = H_I^N(z)H_C^N(z) = \frac{(1-z^{-D})^N}{(1-z^{-1})^N} = \left[\sum_{k=0}^{D-1} z^{-k}\right]^N$$

where the overall transfer function is $H_{sys}^i(z) = H_{CIC}^i(z) H_{FIR}^i(z)$.

Figure 10:
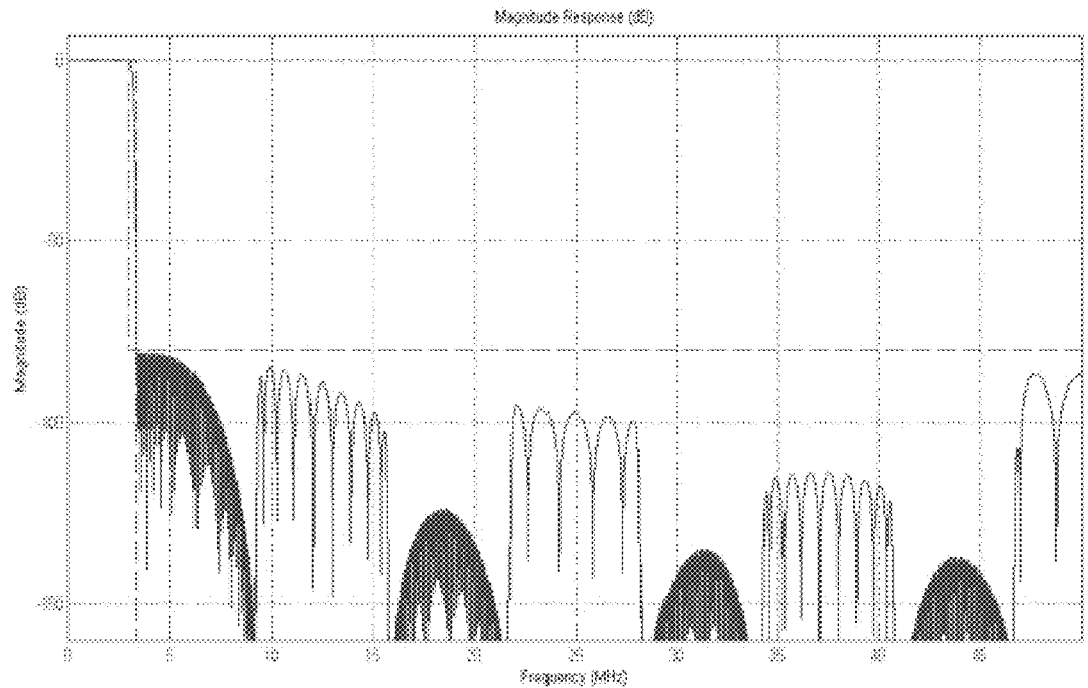
FIGS. 10 and 11 are graphs illustrating the response of a cascaded CIC and FIR filter in accordance with embodiments of the invention.
Figure 11:
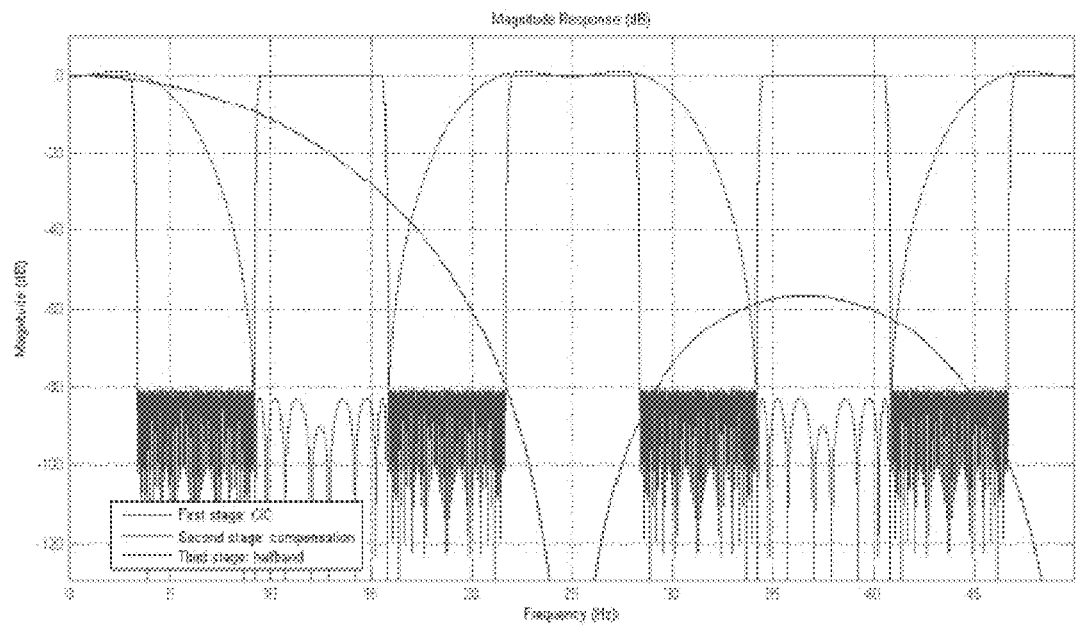

The CIC filter may be utilized to perform interpolation of factor $L_i$ and the FIR filter utilized to eliminate any underlying images from the CIC filter. Interpolation and decimation factors $L_i, M_i$ for the i-th sensor stream can be chosen for the ratio $F_i^S L_i / M_i$ to match the desired sampling frequency for the location fusion engine. In the example discussed above, the overall response of the cascaded CIC and FIR filter has been found to provide better than −100 dB out-of-band attenuation as illustrated in the graphs in FIGS. 10 and 11.

Figure 7:
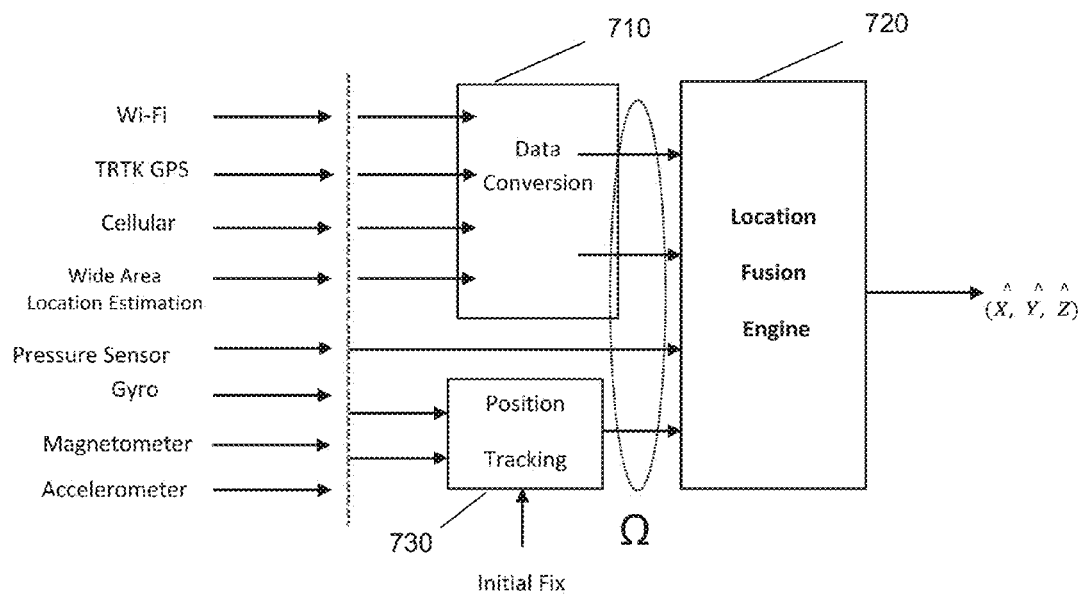
FIG. 7 conceptually illustrates a data conversion engine for converting sensor input to common scale and unit in accordance with embodiments of the invention.
Figure 12:
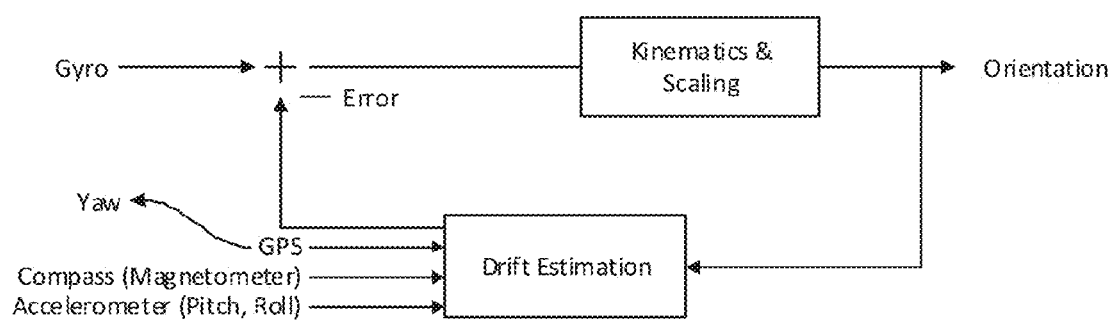
FIG. 12 conceptually illustrates a position tracking engine in accordance with embodiments of the invention.
Figure 13:
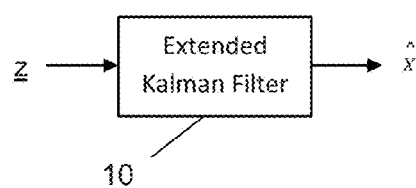
FIG. 13 conceptually illustrates an Extended Kalman Filter (EKF) for drift estimation.
Figure 14:
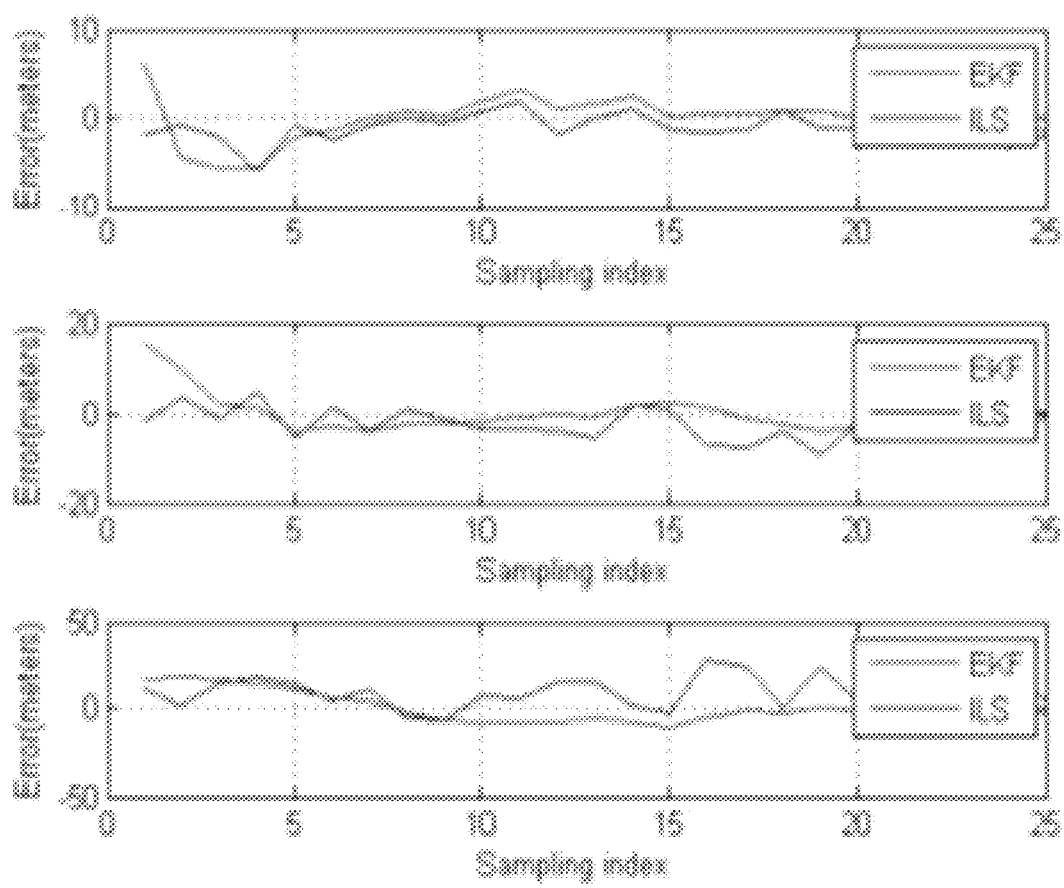
FIG. 14 is a graph illustrating an error signal for a kinematics and scaling block in accordance with embodiments of the invention.

In several embodiments of the invention, one or more sensors generate "motion" type sensor data such as, but not limited to, a gyro, compass, and/or accelerometer. Translating such data to a location vector may involve preprocessing these signals using a position tracking engine as illustrated in FIG. 7. A more detailed block diagram of a position tracking engine in accordance with embodiments of the invention is illustrated in FIG. 12. The position tracking engine 1200 can utilize measurements from the accelerometer and compass when processing the feedback signal from the gyroscope's measurement. Further embodiments may employ an Extended Kalman Filter (EKF) for drift estimation as shown in FIG. 13. The tracking algorithm adapts the position input to the location fusion engine by updating the previous position estimate with new measurement from the output of the block referred to as kinematics and scaling block. This initial condition (IC) value can be the last "waypoint" used for location measurement. The initial condition at system reset or boot time can be set by the relative position of the reader to a known waypoint. This setting establishes the origin of the coordinate system used by the reader system for measuring the coordinates of each asset. The design and implementation of a kinematics and scaling block in accordance with embodiments of the invention such as the one shown in FIG. 12 for handling an error signal such as the signal shown in FIG. 14 from the gyro can be appreciated by one skilled in the art.

Location Fusion Engine and Space Quantization

The optimal maximum aposterior (MAP) location estimate for all of the assets based on the observed vector u can be expressed as:

$$\hat{v} = \underset{v \in \Omega}{\text{Max}^{-1}} Pr(v | u)$$

Figure 15A:
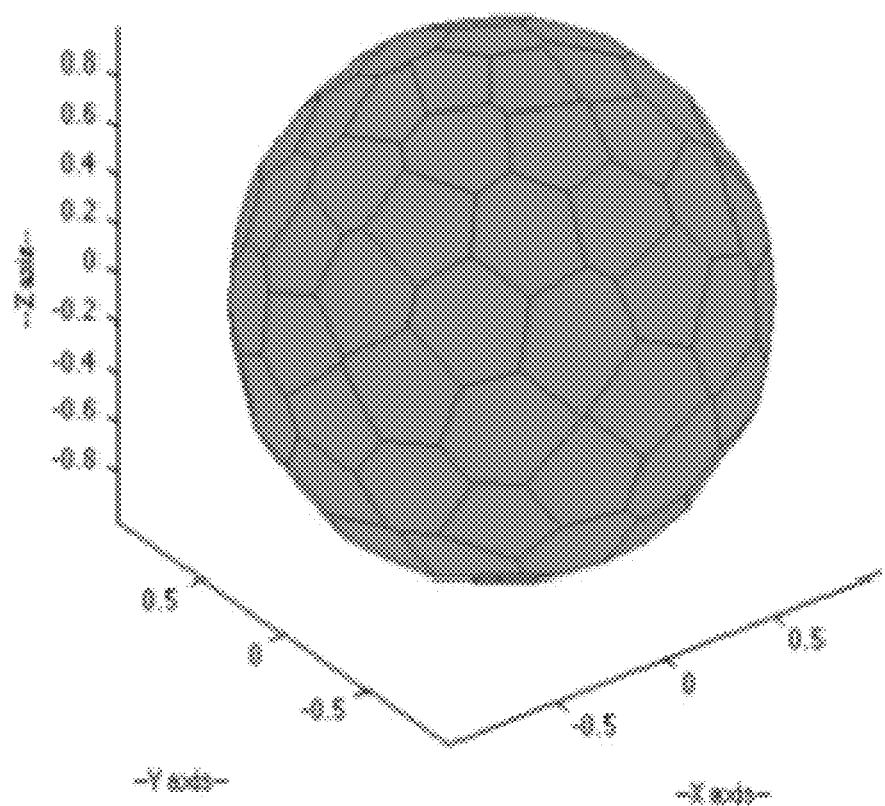
FIG. 15A conceptually illustrates hexagonal cell tessellation of a sphere in accordance with embodiments of the invention.
Figure 15B:
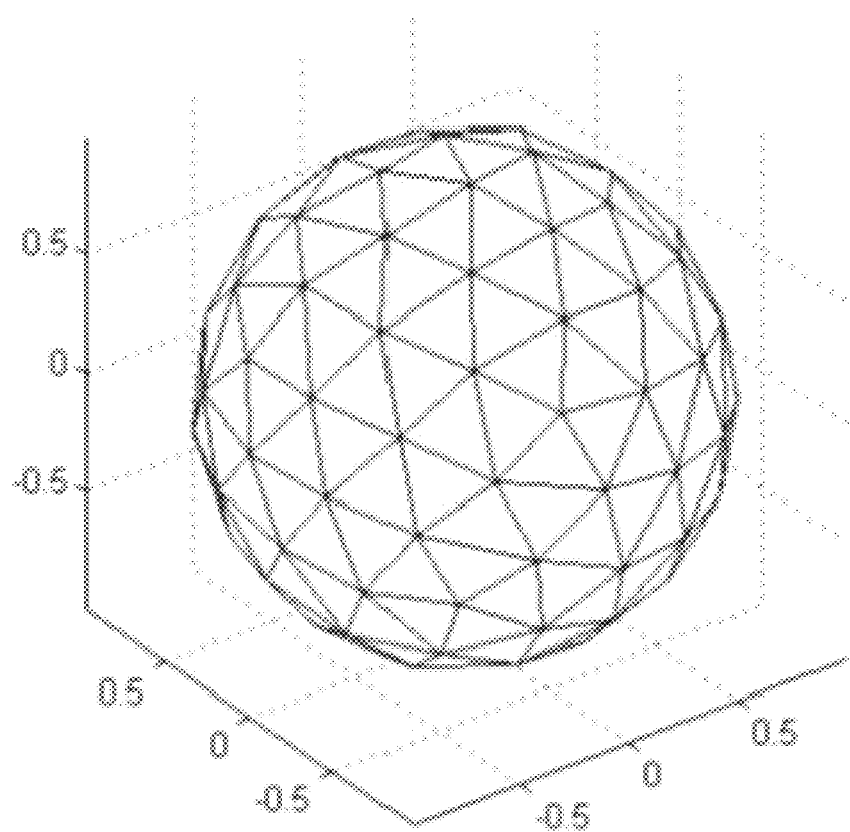
FIG. 15B conceptually illustrates triangular cell tessellation of a sphere in accordance with embodiments of the invention.

This optimization problem can be solved by initially quantizing the surface of the sphere (i.e. earth) representing possible locations of the reader within a subset of the surface of the sphere. In accordance with various embodiments of the invention, the surface of the sphere can be quantized with different forms of tessellations using equally sized cells such as hexagonal cells as shown in FIG. 15A or triangular cells as shown in FIG. 15B. One skilled in the art will recognize that cells of various shapes may be utilized in accordance with embodiments of the invention as appropriate to a specific application. The tessellation can be seen as turning the sphere into a lattice with i-th region being represented as $A_i$. The probability(v|u) can be computed as:

$$Pr(v \in A_i | u)$$

Figure 16A:
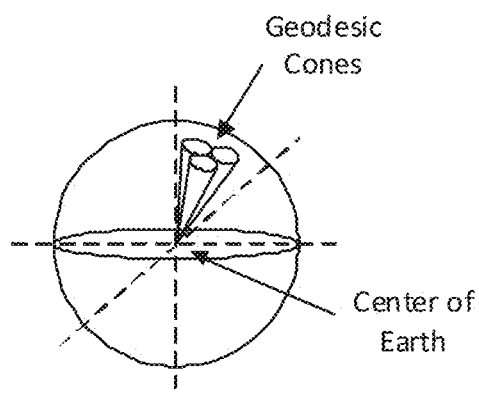
FIG. 16A conceptually illustrates geodesic cones radiating from the center of the sphere (earth) in accordance with embodiments of the invention.

This corresponds to the probability of the location estimate to belong to region $A_i$ (for example triangle complex chain), where $A_i$ forms the proper tessellation on $\Omega$. The two dimensional surface of the sphere can be expressed as $S_2 = U_{i=1}^{N} A_i$. The size of the lattice N can be a variable chosen to satisfy the desired location accuracy for a specific application. In various embodiments, this parameter can be set at configuration time or adapted in real-time, if there is a desire to find both coarse and fine estimates of the location over varying periods of time. A number of approaches to compute the probability of the location estimate belonging to region A as defined above and estimate the location of the reader will be discussed in greater detail further below. It can be noted that in real-world circumstances, location estimation processes may be successful using only a very small subset of cells of the sphere from sensor data for location finding and/or correction. The ambiguity in location position after the initial condition is set is typically limited to a base of a cone from the center of the earth to the region of interest, which in an indoor environment specifically is limited to a physical area that is at most bounded by a square kilometer for the present generation of active and passive sensors. Thus, computing the probability of the location estimate belonging to a region may be simplified to computing the probabilities associated with only the subsets within the region of interest, instead of the whole surface of the sphere. FIG. 16A conceptually illustrates geodesic cones radiating from the center of the sphere (earth) to the surface and FIG. 16B conceptually illustrates a location estimate E[x|y] on location grid (x,y) with Pr(x|y).

Once the location fusion engine determines the solution to the probability of the location estimate belonging to region $A_i$ and output the final estimate of the location of the reader system, the location of any or every asset can be updated and corrected. Without loss of generality, spherical coordinates can be used. Let x', y' and z' denote the corrected coordinates from the previous location estimate (x,y,z) maintained by the LIE, as follows:

x=r sin θ cos φ
y=r sin θ sin φ
z=r cos θ
x'=x=r sin θ cos φ
y'=y cos α−z sin α=(r sin θ sin φ)cos α−(r cos θ) sin α
z'=y sin α+z cos α=(r sin θ sin φ)sin α+(r cos θ) cos α
r'=sqrt(x'$^2$+y'$^2$+z'$^2$)=r
θ'=cos$^{-1}$(z'/r')=cos$^{-1}$(sin θ sin φ sin α+sin θ sin α)
φ'=tan$^{-1}$(y'/x')=tan−1(tan φ cos α−cotan θ sin α sec φ)

Figure 16B:
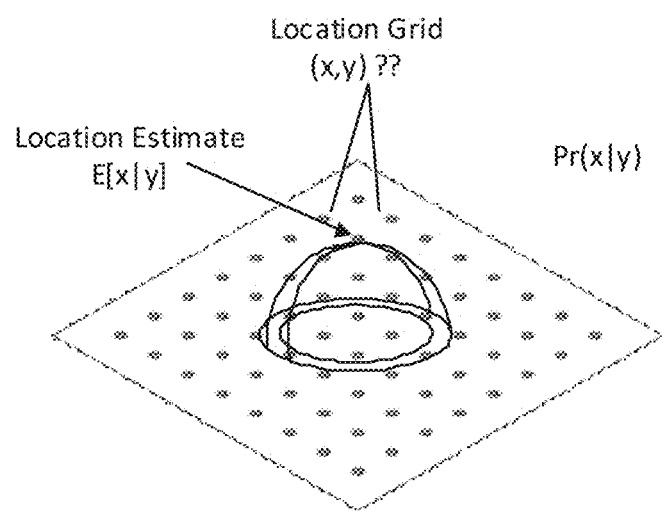
FIG. 16B conceptually illustrates a location estimate on a location grid in accordance with embodiments of the invention.
Figure 17:
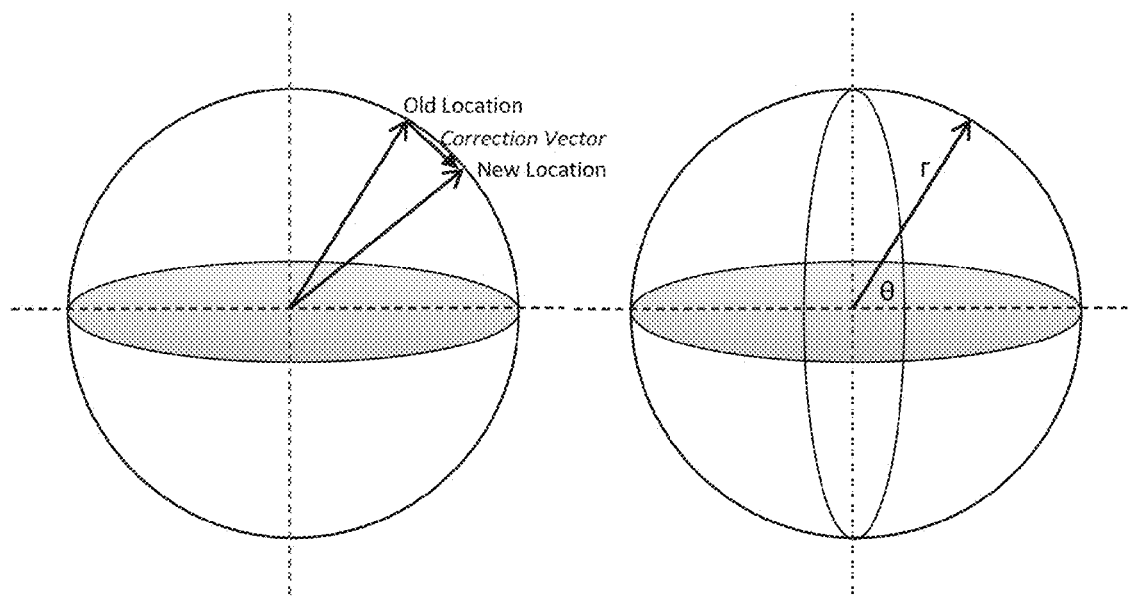
FIG. 17 conceptually illustrates a vector representing a previous location estimate, a vector representing a new location estimate, and a correction vector in accordance with embodiments of the invention.
Figure 18A:
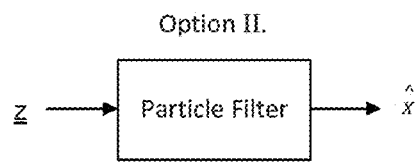
FIGS. 18A, 18B, 18C, and 18D conceptually illustrate different options for generating a location estimate in accordance with various embodiments of the invention.
Figure 18B:
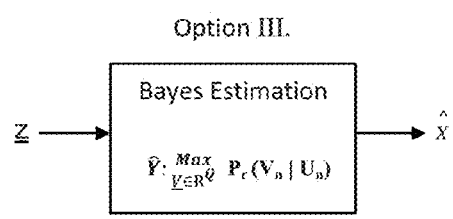
Figure 18C:
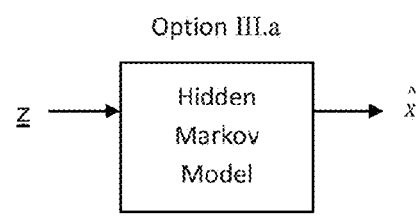
Figure 18D:
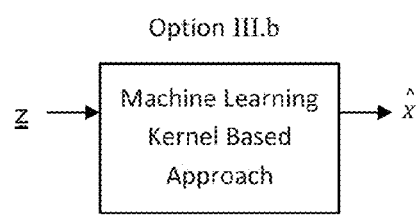

FIG. 16B conceptually illustrates a location estimate on an x,y grid. FIG. 17 conceptually illustrates a vector representing a previous location estimate, a vector representing a new location estimate, and a correction vector from the previous location to the new location.

Location Estimation

The output location estimate $\hat{V}$ can be calculated using a number of options for different use cases. The vector sequence $\{u_n\}$ can be assumed to be a Markov process. Then, any of a number techniques can be applied in accordance with embodiments of the invention, such as, but not limited to, a hidden Markov model, particle filter, and/or kernel based machine learning in generating a location estimate. The different options in accordance with various embodiments of the invention are conceptually illustrated in FIGS. 18A, 18B, 18C, and 18D.

Hidden Markov Model

Figures 19A, 19B:
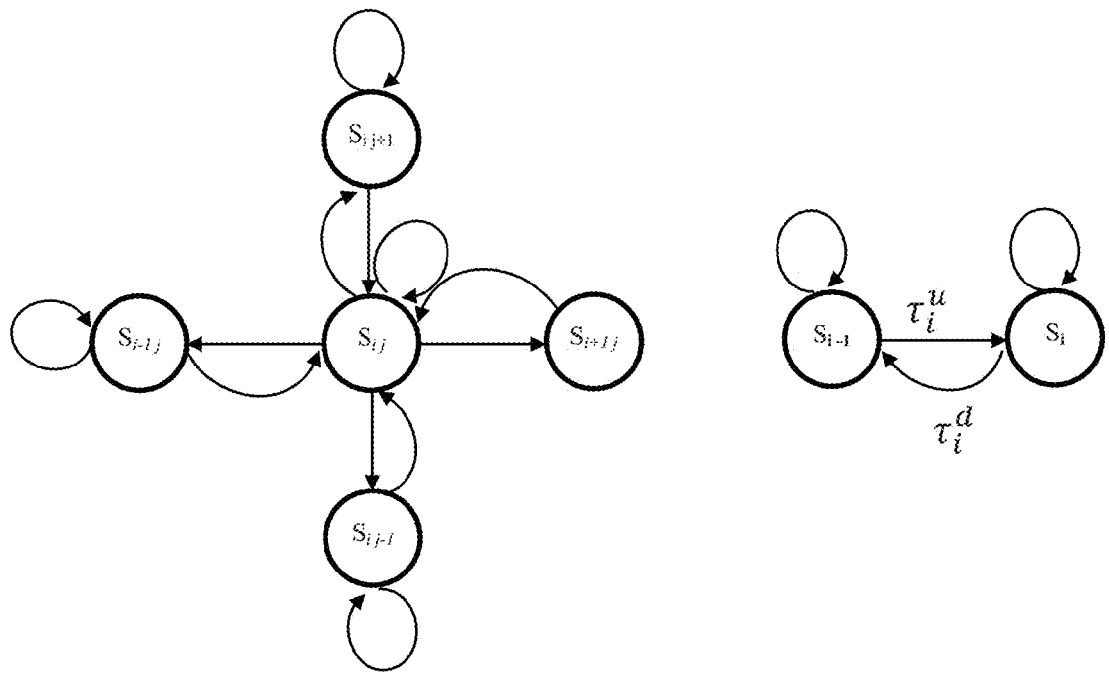
FIG. 19A conceptually illustrates a state diagram for a hidden Markov model approximation in accordance with several embodiments of the invention.
FIG. 19B illustrates a reduced two state Markov machine matrix in accordance with embodiments of the invention.
Figure 20A:
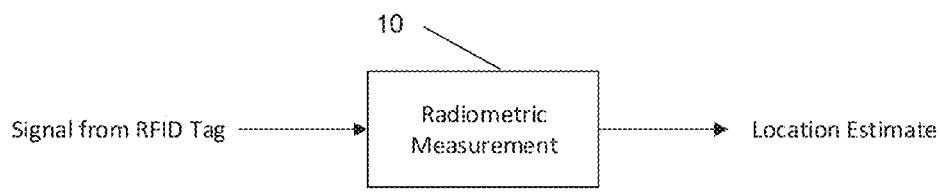
FIGS. 20A, 20B, 20C, and 20D conceptually illustrate different systems for generating location estimates from location information sources in accordance with various embodiments of the invention.
Figure 20B:
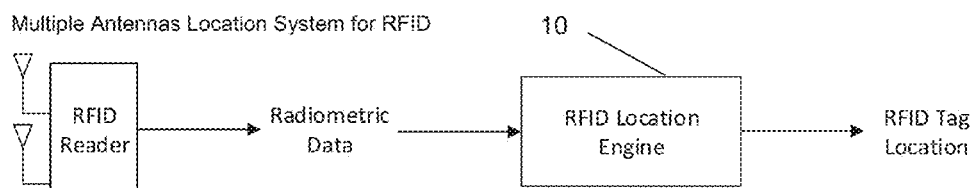
Figure 20C:
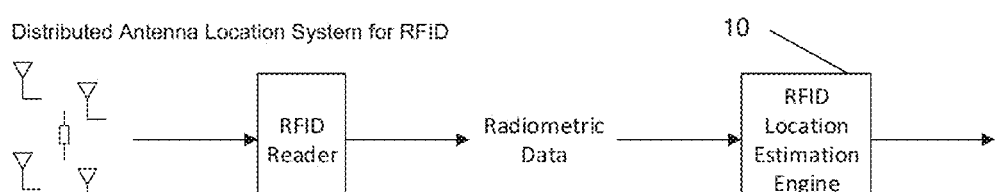
Figure 20D:
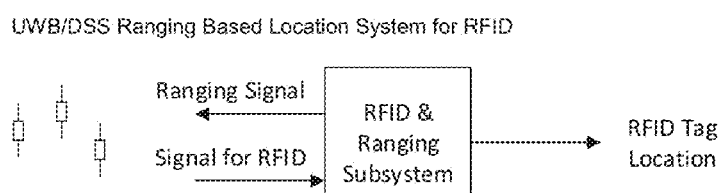
Figure 21:
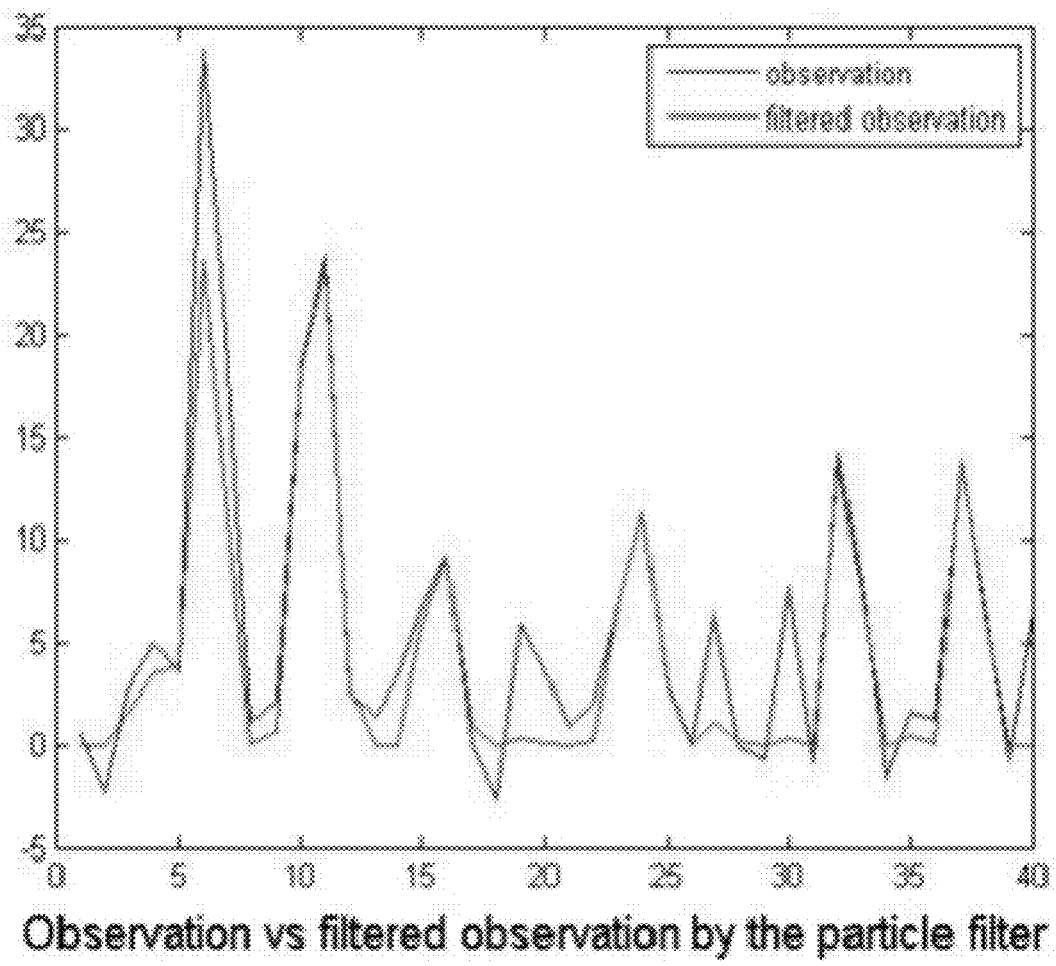
FIGS. 21-27 are graphs illustrating the outcomes of simulations using systems in accordance with embodiments of the invention.
Figure 22:
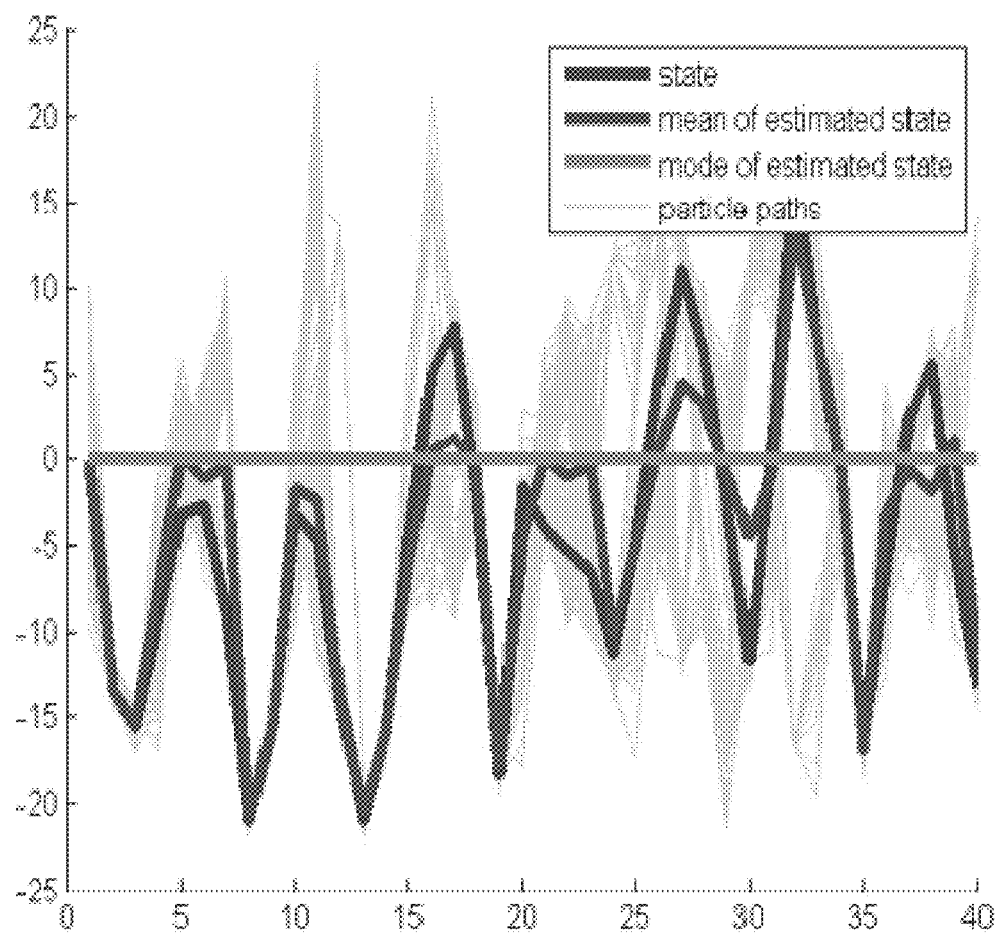
Figure 23:
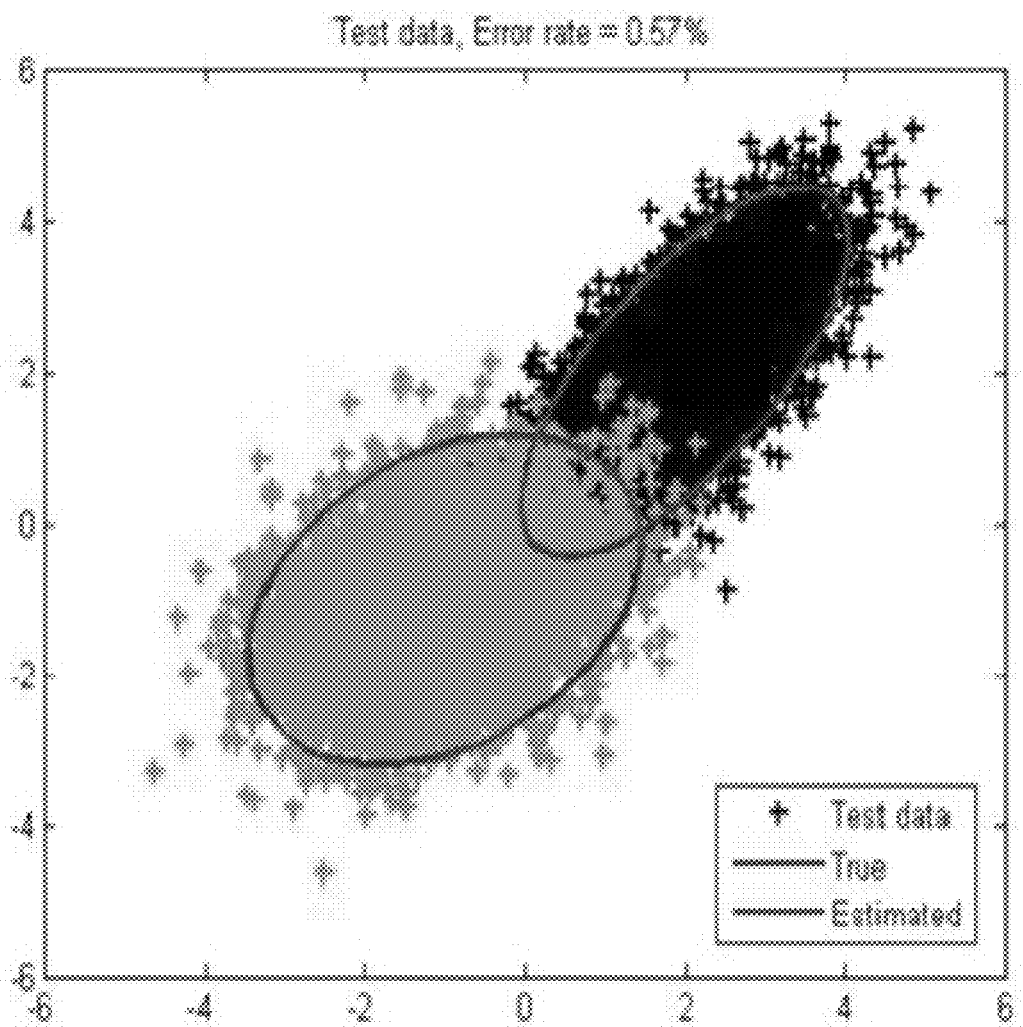
Figure 24:
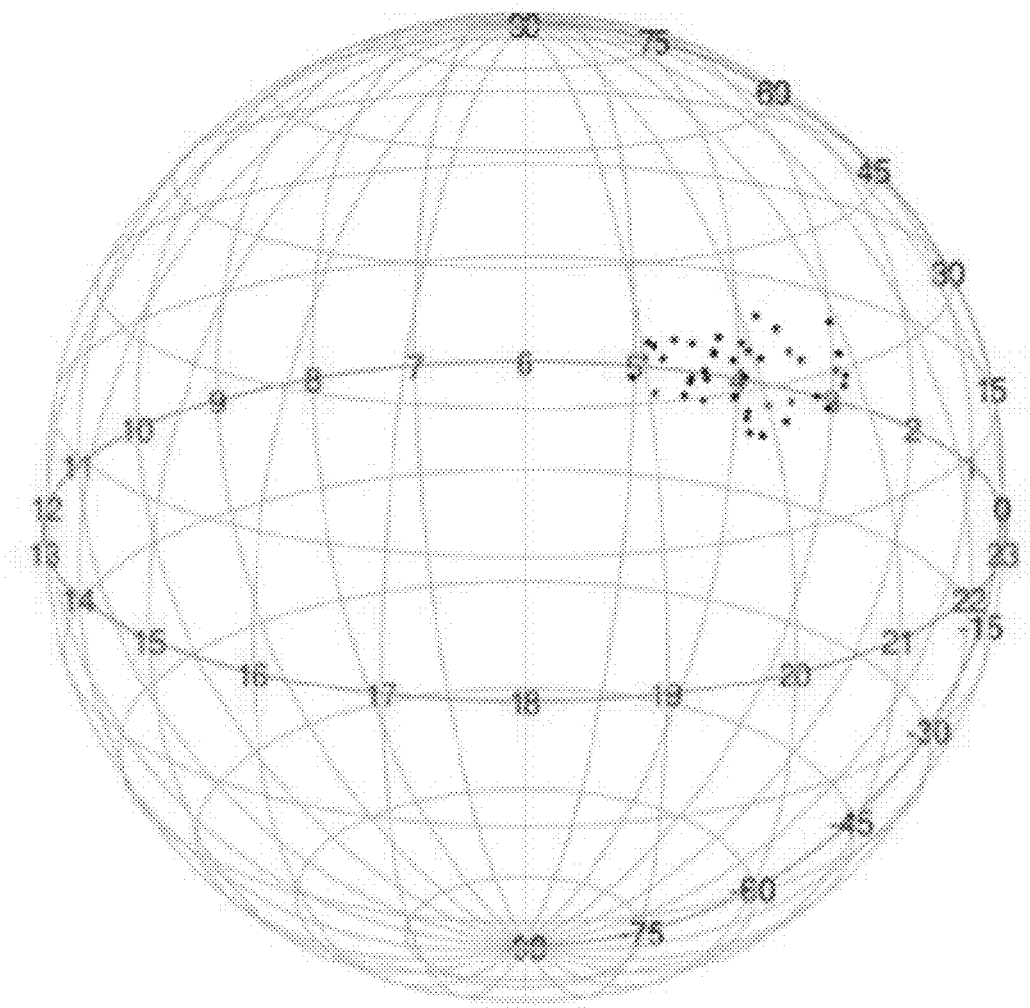
Figure 25:
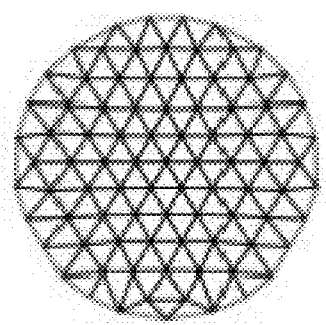
Figure 26:
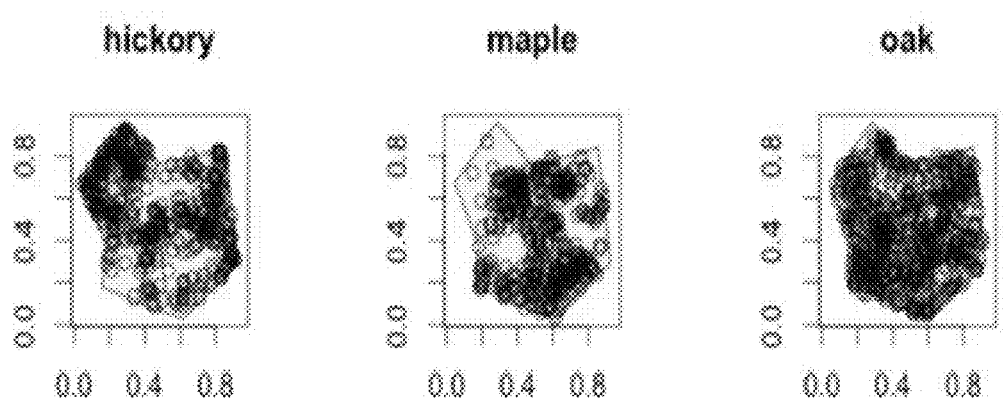
Figure 27:
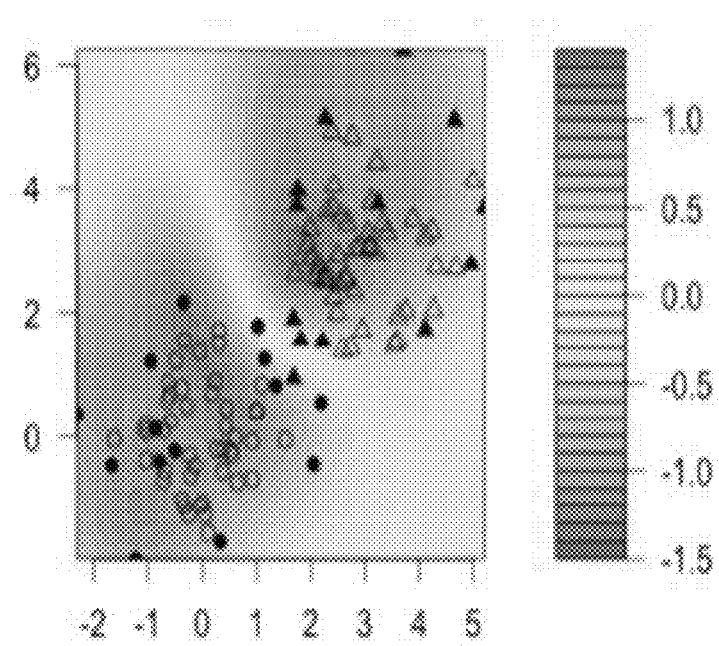

In several embodiments, a hidden Markov model (HMM) is assumed around the location of the reader system. By way of example, for a first order approximation for a two dimensional grid, a state diagram for the HMM in accordance with several embodiments of the invention is shown in FIG. 19A. In this simplified model the location can only change to neighboring cell (triangle). The state of the HMM model is denoted as $S_i$. At each step the transition probability from an state to another is estimated by estimating the probability $Pr(S_i \rightarrow S_{i+1})$. A reduced two state Markov machine matrix in accordance with embodiments of the invention is illustrated in FIG. 19B.

Particle Filter

A robust method for location estimation and tracking based on receiving multiple observations is particle filtering. Monte Carlo methods are a class of computational algorithms that rely on repeated random sampling to compute their results. The sequential importance sampling (SIS) algorithm is a Monte Carlo (MC) method that forms the basis for many sequential MC filters developed over the past two decades. This sequential MC (SMC) approach is known variously as bootstrap filtering, the condensation algorithm, and particle filtering. Particle filters are advanced model estimation techniques that can be based on simulation.

A recursive Bayesian filter can be implemented by MC simulations. The required posterior density function can be represented by a set of random samples with associated weights and estimates can be computed based on these samples and weights. As the number of samples becomes very large, this MC characterization becomes an equivalent representation to the usual functional description of the posterior probability density function (pdf), and the SIS filter approaches the optimal Bayesian estimate. As mentioned they are typically used to estimate Bayesian models and are the sequential namely on-line analogue of Markov chain Monte Carlo (MCMC) batch methods and are often similar to importance sampling methods. If well designed, particle filters can be much faster than MCMC. They are often an alternative to the Extended Kalman filter (EKF) or Unscented Kalman filter (UKF) with the advantage that, with sufficient samples, they approach the Bayesian optimal estimate, so they can be made more accurate than the EKF or UKF. The approaches can also be combined by using a version of the Kalman filter as a proposal distribution for the particle filter.

Consider a nonlinear state space model that satisfies the Hidden Markov model (HMM) that was described further above.

For HMM the assumptions are:

The state sequence $x_k$, k=0, 1, 2, . . . is a Markov process. That means $p(x_k|x_{k-1},past) = p(x_k|x_{k-1})$. Past means the event $\{x_{0:k-2}\}$.

The observations $y_k$, k=1, 2 , . . . are conditionally independent given the state at time index k. This means $p(y_k|x_k,$ future, past$)=p(y_k|x_k)$. Future means $\{x_{k+1:T}, y_{k+1:T}\}$, and past means $\{x_{0:k-1}, y_{1:k}\}$.

Thus assume $x_k$ and the observations $y_k$ can be modeled in this form:

$x_0, x_1, \ldots x_k$ is a first order Markov process such that $x_k|x_{k-1} \sim p_{x_k|x_{k-1}}(x|x_{k-1})$ and with an initial distribution $p(x0)$.

The observations $y_1, y_2, \ldots, y_k$ are conditionally independent provided that $x_0, x_1, \ldots x_k$ are known. In other words, each $y_k$ only depends on $x_k$ $y_k|x_k \sim p_{y_k|x_k}(y|x_k)$ One example form of this could be:

$x_k = f_k(x_{k-1}, v_{k-1})$ $y_k = h_k(x_k, n_k)$

Or another example form of this could be:

$x_k = f_k(x_{k-1}) + v_{k-1}$ $y_k = h_k(x_k) + n_k$ where both $v_k$ and $n_k$ are mutually independent and identically distributed sequences with known probability density functions and f(.) and h(.) are known functions.

These two equations can be viewed as state space equations and look similar to the state space equations for the Kalman filter. If the functions f(.) and h(.) were linear, and if both $v_k$ and $n_k$ were Gaussian, the Kalman filter finds the exact Bayesian filtering distribution. If not, Kalman filter based methods are a first-order approximation. Particle filters are also an approximation, but with enough particles can be much more accurate.

Particle methods, like all sampling-based approaches (e.g., MCMC), generate a set of samples that approximate the filtering distribution $p(x_k|y_1, y_2, \ldots, y_k)$. So, with L samples, expectations with respect to the filtering distribution can be approximated by $$\int f(x_k) p(x_k|y_1, y_2, \ldots, y_k) dx_k \approx \frac{1}{L} \sum_{i=1}^{L} f(x_k^{(i)})$$

and f(.) in the usual way for a Monte Carlo method, can give all the moments etc. of the distribution up to some degree of approximation.

Generally, the algorithm is repeated iteratively for a specific number of k values (call this N). Initializing $x_k=0|k=0$ for all particles provides a starting place to generate $x_1$, which can then be used to generate $x_2$, which can be used to generate $x_3$ and so on up to k=N. When done, the mean of $x_k$ over all the particles $$\left( \text{or } \frac{1}{L} \sum_{i=1}^{L} f(x_k^{(i)}) \right)$$

is approximately the actual value of $x_k$.

In order to develop the details of the Sequential Importance Sampling (SIS) process, let $\{\omega_k^i, x_{0:k}^i\}_{i=1}^{L}$ denote a random measure that characterizes the posterior probability density function (pdf) $(x_{0:k}|y_{1:k})$, where $\{x_{0:k}^i, i=0,1,\ldots L\}$, is a set of support points with associated weights $\{\omega_k^i, i=0,1,\ldots L\}$, and $x_{0:k}=\{x_i, i=0,1,\ldots k\}$, is the set of all states up to time k. The weights are normalized such that $\Sigma_{i=1}^{L} \omega_k^i = 1$. Then, the posterior density at k can be approximated as $$p(x_{0:k} | y_{1:k}) \approx \sum_{i=1}^{L} \omega_k^i \delta(x_{0:k} - x_{0:k}^i)$$

This produces a discrete weighted approximation to the true posterior $p(x_{0:k}|y_{1:k})$. The weights can be chosen using the principle of importance sampling. Suppose $p(x_{0:k}|y_{1:k})$ is a probability density from which it is difficult to draw samples but for which the probability density function can be evaluated up to proportionality. In addition, let $x_{0:k}^i \sim q(x_{0:k}|y_{1:k})$ be samples that are easily generated from a proposal $q(x_{0:k}|y_{1:k})$, referred to as an importance density. Then, a weighted approximation to the density is given by $$p(x_{0:k} | y_{1:k}) \approx \sum_{i=1}^{L} \omega_k^i \delta(x_{0:k} - x_{0:k}^i)$$

where $$\omega_k^i \propto \frac{p(x_{0:k}^i | y_{1:k})}{q(x_{0:k}^i | y_{1:k})}$$

is the normalized weight of the i-th particle. Note that this concept applies to any p(.) and with corresponding importance density q(.) whether it is a conditional or a marginal density function.

Returning to the sequential case, at each iteration, one could have samples constituting an approximation to $p(x_{0:k-1}|y_{1:k-1})$ and want to approximate $p(x_{0:k}|y_{1:k})$ with a new set of samples. If the impoance density is chosen to factorize such that $q(x_{0:k}|y_{1:k}) = q(x_k|x_{0:k-1}, y_{1:k}) q(x_{0:k-1}|y_{1:k-1})$ then samples $x_{0:k}^i \sim q(x_{0:k}|y_{1:k})$ can be obtained by augmenting each of the existing samples $x_{0:k-1}^i \sim q(x_{0:k-1}|y_{1:k-1})$, with the new state $x_k^i \sim q(x_k|x_{0:k-1}, y_{1:k})$. To derive the weight update equation, $p(x_{0:k}|y_{1:k})$ is first expressed in terms of $p(x_{0:k-1}|y_{1:k-1})$, $p(y_k|x_k)$, and $p(x_k|x_{k-1})$.

Note that $$p(x_{0:k} | y_{1:k}) = \frac{p(y_k | x_{0:k}, y_{1:k-1}) p(x_{0:k} | y_{1:k-1})}{p(y_k | y_{1:k-1})}$$

$$= \frac{p(y_k | x_{0:k}, y_{1:k-1}) p(x_k | x_{0:k-1}, y_{1:k-1}) p(x_{0:k-1} | y_{1:k-1})}{p(y_k | y_{1:k-1})}$$

This can be written as $$p(x_{0:k} | y_{1:k}) = \frac{p(y_k | x_k) p(x_k | x_{k-1}) p(x_{0:k-1} | y_{1:k-1})}{p(y_k | y_{1:k-1})} \propto$$

$$p(y_k | x_k) p(x_k | x_{k-1}) p(x_{0:k-1} | y_{1:k-1})$$

By substituting, the weight update equation can then be shown to be:

$$\omega_k^i \propto \frac{p(y_k|x_k^i)p(x_k^i|x_{k-1}^i)p(x_{0:k-1}^i|y_{1:k-1})}{q(x_k^i|x_{0:k-1}^i,y_{1:k})q(x_{0:k-1}^i|y_{1:k-1})} = \omega_{k-1}^i \frac{p(y_k|x_k^i)p(x_k^i|x_{k-1}^i)}{q(x_k^i|x_{0:k-1}^i,y_{1:k})}$$

Furthermore, if $q(x_k|x_{0:k-1}, y_{1:k})=q(x_k|x_{k-1}, y_k)$, then the importance density becomes only dependent on $x_{k-1}$ and $y_k$. This is particularly useful in the common case when only a filtered estimate of $p(x_k|y_{1:k})$ is required at each time step. For the remaining discussion below, this case can be assumed, except when stated otherwise. In such scenarios, only $x_k^i$ need to be stored; therefore, one can discard the path $x_{0:k-1}^i$ and history of observations $y_{1:k-1}$. The modified weight is then $$\omega_k^i \propto \omega_{k-1}^i \frac{p(y_k|x_k^i)p(x_k^i|x_{k-1}^i)}{q(x_k^i|x_{k-1}^i, y_k)}$$

and the posterior filtered density $p(x_k|y_{1:k})$ can be approximated as $$p(x_k|y_{1:k}) \approx \sum_{i=1}^{L} \omega_k^i \delta(x_k - x_k^i)$$

where the weights are defined by the above approximation. It can be shown that as $L \to \infty$, the approximation approaches the true posterior density $p(x_k|y_{1:k})$. The SIS algorithm thus consists of recursive propagation of the weights and support points as each measurement is received sequentially.

Basic SIS Particle Filter

Pseudo code for a basic SIS particle filter utilizing the above calculations may be expressed as follows:

$\{(x_k^i, \omega_k^i): i=1, \ldots, L\} = \text{SIS}\{(x_k^i, \omega_k^i): i=1, \ldots L, y_k\}$ FOR i=1,L Draw particle $x_k^i q(x_k|x_{k-1}^i, y_k)$ Assign weight $\omega_k^i$ to the particle based on the equation above for the modified weight $\omega_k^i$

END FOR

A common problem with the SIS particle filter is the degeneracy phenomenon, where after a few iterations, all but one particle will have negligible weight. It has been asserted that the variance of the importance weights can only increase over time, and thus, it would be impossible to avoid the degeneracy phenomenon. This degeneracy implies that a large computational effort is devoted to updating particles whose contribution to the approximation to $p(x_k|y_{1:k})$ is almost zero. A suitable measure of degeneracy of the algorithm is the effective sample size $N_{eff}$ which can be defined as:

$$N_{eff} = \frac{L}{1 + \text{Var}\{\omega_k^{t,i}\}}$$

where $$\omega_k^{t,i} = \frac{p(x_k^i|y_{1:k})}{q(x_k^i|x_{k-1}^i, y_k)}$$

is referred to as the "true weight." While this may not be evaluated exactly, an estimate can be obtained as:

$$\hat{N}_{eff} = \frac{L}{\sum_{i=1}^{L}(\omega_k^i)^2}$$

where $\omega_k^i$ is the normalized weight obtained using the weight update equation for $\omega_k^i$ above. Notice that $N_{eff} \leq L$, and small $N_{eff}$ indicates severe degeneracy. Clearly, the degeneracy problem is an undesirable effect in particle filters. A brute force approach to reducing its effect is to use a very large L. This is often impractical; therefore, at least two other methods can be utilized: 1) good choice of importance density and 2) use of resampling.

Choice of Importance Density: The first method involves choosing the importance density $q(x_k|x_{k-1}^i, y_k)$ to minimize $\text{Var}\{\omega_k^{t,i}\}$ so that $N_{eff}$ is maximized. The optimal importance density function that minimizes the variance of the true weights $\omega_k^{t,i}$ conditioned on $x_{k-1}^i$ and $y_k$ can be shown to be $$q(x_k|x_{k-1}^i, y_k)_{opt} = p(x_k|x_{k-1}^i, y_k) = \frac{p(y_k|x_k, x_{k-1}^i)p(x_k|x_{k-1}^i)}{p(y_k|x_{k-1}^i)}$$

Substitution of the equation above for the modified weight $\omega_k^i$ k into the equation for factorizing the importance density $q(x_{0:k}|y_{1:k})$ yields $$\omega_k^i \propto \omega_{k-1}^i p(y_k|x_{k-1}^i) = \omega_{k-1}^i \int p(y_k|x_k)p(x_k|x_{k-1}^i)dx_k$$

This choice of importance density can be considered optimal because for a given $x_{k-1}^i$, $\omega_k^i$ takes the same value, whatever sample is drawn from $q(x_k|x_{k-1}^i, y_k)_{opt}$. Hence, conditional on $x_{k-1}^i$, $\text{Var}\{\omega_k^{t,i}\}=0$. This is the variance of the different results from different sampled $x_k^i$. This optimal importance density may have two potential drawbacks. It requires the ability to sample from $p(x_k|x_{k-1}^i, y_k)$ and to evaluate the integral over the new state. In the general case, it may not be straightforward to do either of these things. There are two cases when use of the optimal importance density is possible. The first case is when $x_k$ is a member of a finite set. In such cases, the integral in the equation above becomes a sum, and sampling from $p(x_k|x_{k-1}^i, y_k)$ is possible. An example of an application when $x_k$ is a member of a finite set is a Jump-Markov linear system for tracking maneuvering targets, whereby the discrete model state (defining the maneuver index) is tracked using a particle filter, and (conditioned on the maneuver index) the continuous base state is tracked using a Kalman filter.

Analytic evaluation is possible for a second class of models for which $p(x_k|x_{k-1}^i, y_k)$ is Gaussian. This can occur if the dynamics are nonlinear and the measurements linear. Such a system can be given by $$x_k = f_k(x_{k-1}) + v_{k-1}$$

$$y_k = H_k x_k + n_k$$

where $$v_{k-1} \sim N(0, Q_{k-1})$$

$$n_k \sim N(0, R_k)$$

and $f_k$ is a nonlinear function, $H_k$ is an observation matrix, and $v_{k-1}$ and $n_k$ are mutually independent and identically distributed (i.i.d.) Gaussian sequences. Defining $$S_k=(Q_{k-1}^{-1}+H_k^TR_k^{-1}H_k)^{-1}$$

$$m_k=S_k(Q_{k-1}^{-1}f_k(x_{k-1})+H_k^TR_k^{-1}y_k)$$

one obtains $$p(x_k|x_{k-1},y_k)=N(x_k;m_k,S_k)$$

and $$p(y_k|x_{k-1})=N(y_k;H_kf_k(x_{k-1}), Q_{k-1}+H_kR_kH_k^T)$$

For many other models, such analytic evaluations are not possible. However, it is possible to construct suboptimal approximations to the optimal importance density by using local linearization techniques. Such linearizations use an importance density that is a Gaussian approximation to $p(x_k|x_{k-1},y_k)$. Another approach is to estimate a Gaussian approximation to $p(x_k|x_{k-1},y_k)$ using the unscented transform. The additional computational cost of using such an importance density is often more than offset by a reduction in the number of samples required to achieve a certain level of performance. Finally, it is often convenient to choose the importance density to be the prior $$p(x_k|x_{k-1}^i,y_k)=p(x_k|x_{k-1}^i)$$

Substitution of this equation into the equation above for modified weight $\omega_k^i$ then yields $$\omega_k^i \propto \omega_{k-1}^i p(y_k|x_k^i)$$

This would seem to be the most common choice of importance density since it is intuitive and simple to implement. However, there are other densities that can be used in accordance with a number of embodiments of the invention.

Resampling: A second method by which the effects of degeneracy can be reduced is to use resampling whenever a significant degeneracy is observed (i.e., when $N_{eff}$ falls below some threshold $N_T$). The basic idea of resampling is to eliminate particles that have small weights and to concentrate on particles with large weights. The resampling step involves generating a new set $\{x_k^{i*}\}_{i-1}^L$ by resampling (with replacement) L times from an approximate discrete representation of $p(x_k|y_{1:k})$ given by $$p(x_k|y_{1:k}) \approx \Sigma_{i=1}^L \omega_k^i \delta(x_k-x_k^i)$$

so that $Pr(x_k^{i*}=x_k^j)=\omega_k^j$. The resulting sample is in fact an i.i.d. sample from the discrete density $p(x_k|y_{1:k})$; therefore, the weights are now reset to $$\omega_k^i = \frac{1}{L}.$$

It is possible to implement this resampling procedure in O(L) (means linear in L) operations by sampling L ordered uniforms using an algorithm based on order statistics. Note that other efficient (in terms of reduced MC variation) resampling schemes, such as stratified sampling and residual sampling, may be applied as alternatives to this approach.

Systematic resampling is the scheme preferred in a number of embodiments [since it is simple to implement, takes O(L) time, and minimizes the MC variation], and its operation is described in Systematic Resampling (further below), where U[a, b] is the uniform distribution on the interval [a, b] (inclusive of the limits). A generic particle filter then can be described by Generic Particle Filter (further below). Although the resampling step reduces the effects of the degeneracy problem, it can introduce other practical problems. First, it may limit the opportunity to parallelize since all the particles must be combined. Second, the particles that have high weights $\omega_k^i$ are statistically selected many times. This can lead to a loss of diversity among the particles as the resultant sample will contain many repeated points. This problem, which is known as sample impoverishment, is severe in the case of small process noise. In fact, for the case of very small process noise, all particles will collapse to a single point within a few iterations. Third, since the diversity of the paths of the particles is reduced, any smoothed estimates based on the particles' paths degenerate. Schemes can be utilized to counteract this effect. One approach considers the states for the particles to be predetermined by the forward filter and then obtains the smoothed estimates by recalculating the particles' weights via a recursion from the final to the first time step. Another approach is to use a Markov chain Monte Carlo (MCMC) based process.

Systematic Resampling

Pseudo code for a process to reduce the effects of degeneracy using systematic resampling as discussed above can be express as follows:

---

$\{(x_k^{j*}, \omega_k^j): j = 1, \ldots, L\}$ = Resample$\{(x_k^i, \omega_k^i): i = 1, \ldots, L\}$
Initialize the CDF: $c_1 = 0$
FOR i = 2: L
    Construct CDF: $c_i = c_{i-1} + \omega_k^i$
END FOR
Start at the bottom of the CDF: i = 1

Draw a starting point: $u_1 \sim U\left[0, \frac{1}{L}\right]$

FOR j = 1: L

Move along the CDF: $u_j = u_1 + \frac{1}{L}(j-1)$

WHILE $u_j > c_i$
        i = i + 1
        j* = j
    END WHILE

Assign sample: $x_k^{j*} = x_k^i$
    Assign weight: $\omega_k^j = \frac{1}{L}$

END FOR

---

Generic Particle Filter

Pseudo code for a process to reduce the effects of degeneracy using a particle filter as discussed further above can be expressed as follows:

{($x_k^i$, $\omega_k^i$): i = 1, ..., L} = GPF{($x_k^i$, $\omega_k^i$): i = 1, ..., L, $y_k$}
FOR i = 1: L
    Draw $x_k^i \sim q(x_k | x_{k-1}^i, y_k)$
    Assign the particle a weight, $\omega_k^i$
    Based on the equation for modified weight $\omega_k^i$ above
END FOR
Calculate total weight: t = sum [{$\omega_k^i$}, i = 1, ..., L]
FOR i = 1: L
    Normalize: $\omega_k^i = \dfrac{\omega_k^i}{t}$
END FOR
Calculate $\hat{N}_{eff}$ using equation the equation for estimated $\hat{N}_{eff}$ above
IF $\hat{N}_{eff} < \hat{N}_T$
    Resample using Systematic Resampling (see above) or other resampling scheme:
    {($x_k^i$, $\omega_k^i$): i = 1, ..., L} = Resample{($x_k^i$, $\omega_k^i$): i = 1, ..., L}
END IF There have been some systematic techniques proposed to solve the problem of sample impoverishment. One such technique is the resample-move algorithm. Although this technique draws conceptually on the same technologies of importance sampling-resampling and MCMC sampling, it avoids sample impoverishment. It does this in a rigorous manner that ensures the particles asymptotically approximate samples from the posterior and, therefore, is the method of choice by many researchers.

An alternative solution to the same problem is regularization. This approach is frequently found to improve performance, in preference to the resample-move algorithm since its use was so widespread.

Techniques for Circumventing the Use of a Suboptimal Importance Density: In some cases a good importance density is not available. For example, if the prior $p(x_k|x_{k-1})$ is used as the importance density and is a much broader distribution than the likelihood ($y_k|x_k$), then only a few particles will have a high weight. Methods can be utilized for encouraging the particles to be in the right place; the use of bridging densities and progressive correction both introduce intermediate distributions between the prior and likelihood. The particles are then reweighted according to these intermediate distributions and resampled. This herds the particles into the right part of the state space. Another approach referred to as partitioned sampling is useful if the likelihood is very peaked but can be factorized into a number of broader distributions. Typically, this occurs because each of the partitioned distributions are functions of some (not all) of the states. By treating each of these partitioned distributions in turn and resampling on the basis of each such partitioned distribution, the particles are again herded toward the peaked likelihood.

Sampling Importance Resampling (SIR)

One particular particle filtering algorithm that can be utilized in accordance with embodiments of the invention is sampling importance resampling (SIR). SIR approximates the filtering distribution $p(x_k|y_1, y_2, ..., y_k)$ by a weighted set of particles {($x_k^i$, $\omega_k^i$): i=1, ..., L}. The importance weights $\omega_k^i$ are approximations to the relative posterior probabilities (or densities) of the particles such that $\Sigma_{i=1}^L \omega_k^i = 1$. SIR is a sequential (i.e., recursive) version of importance sampling. As in importance sampling, the expectation of a function $f(.)$ can be approximated as a weighted average:

$$\int f(x_k) p(x_k|y_1, y_2, ..., y_k) dx_k \approx \Sigma_{i=1}^L \omega^i f(x_k^i)$$

The algorithm performance is dependent on the choice of the importance distribution:

$$q(x_k|x_{0:k-1}, y_{1:k})$$

The optimal importance distribution can be given as:

$$q(x_k|x_{:k-1}, y_{1:k}) = p(x_k|x_{k-1}, y_k)$$

However, the transition prior is often used as importance function, since it can be easier to draw particles (or samples) and perform subsequent importance weight calculations:

$$q(x_k|x_{0:k-1}, y_{1:k}) = p(x_k|x_{k-1}).$$

SIR filters with transition prior as importance function can be referred to as bootstrap filters and condensation algorithms.

As discussed further above, resampling can be used to avoid the problem of degeneracy of the algorithm, that is, avoiding the situation that all but one of the importance weights are close to zero. The performance of the algorithm can be also affected by proper choice of resampling method. Resampling methods that can be utilized in accordance with embodiments of the invention include, but are not limited to, Systematic Resampling (popular and can be considered simplest and sometimes referred to as universal resampling), Residual Resampling, Multinomial Resampling, and Stratified Resampling. Stratified Resampling can be considered optimal in terms of variance.

In summary and clarity, a single step of sequential importance resampling can be expressed as follows:

For i=1,2, ..., L draw samples from the importance distributions:

$$x_k^i \sim q(x_k|x_{0:k-1}^i, y_{1:k})$$

For i=1,2, ..., L evaluate the importance weights up to a normalizing constant:

$$\hat{\omega}_k^i = \hat{\omega}_{k-1}^i \frac{p(y_k|x_k^i) p(x_k^i|x_{k-1}^i)}{q(x_k^i|x_{0:k-1}^i, y_{1:k})}$$

For i=1,2, ..., L compute the normalized importance weights:

$$\omega_k^i = \frac{\hat{\omega}_k^i}{\sum_{i=1}^L \hat{\omega}_k^i}$$

Compute an estimate of the effective number of particles as:

$$\hat{N}_{eff} = \frac{1}{\sum_{i=1}^L (\omega_k^i)^2}$$

If the effective number of particles is less than a given threshold $\hat{N}_{\mathit{eff}} < N_T = \beta L$, then perform resampling:

a) Draw L particles from the current particle set with probabilities proportional to their weights. One of 4 methods mentioned above can be used. Replace the current particle set with this new one.

b) For i=1,2, ..., L set $$\omega_k^i = \frac{1}{L}.$$

The term Sequential Importance Resampling is also sometimes used when referring to SIR filters. Pseudo code of the above (for bootstrap filter) as an SIR Particle Filter in accordance with embodiments of the invention is provided below:

| SIR Particle Filter |
| --- |
| $\{(x_k^i, \omega_k^i): i = 1, \ldots, L\} = \text{SIR}\{(x_k^i, \omega_k^i): i = 1, \ldots, L, y_k\}$<br>FOR i = 1: L<br>    Draw $x_k^i \sim p(x_k\|x_{k-1}^i)$<br>    Calculate, $\omega_k^i = p(y_k\|x_k^i)$<br>END FOR<br>Calculate total weight: t = sum[$\{\omega_k^i\}$, i = 1, ..., L]<br>FOR i = 1: L<br>    Normalize: $\omega_k^i = \frac{\omega_k^i}{t}$<br>END FOR<br>Resample using Systematic Resampling (see above) or other resampling scheme:<br>$\{(x_k^i, \omega_k^i): i = 1, \ldots, L\} = \text{Resample}\{(x_k^i, \omega_k^i): i = 1, \ldots, L\}$ |

Particle Filter—Direct Version

A "direct version" algorithm is rather simple (compared to other particle filtering algorithms) and it uses composition and rejection. To generate a single sample x at k from $p_{x_k|y_{1:k}}(x|y_{1:k})$:

| | |
| --- | --- |
| 1) | Set i = 1 |
| 2) | Uniformly generate i from {1, ..., L} |
| 3) | Generate a test $\hat{x}$ from its distribution $p_{x_k\|x_{k-1}}(x\|x_{k-1}^{(i)})$ |
| 4) | Generate the probability of $\hat{y}$ using $\hat{x}$ from $p_{y\|x}(y_k\|\hat{x})$ where $y_k$ is the measured value |
| 5) | Generate another uniform u from [0, $m_k$] ($m_k = \sup_x p(y\|x)$ if the observation density is bounded) |
| 6) | Compare u and $\hat{y}$ |
| 6a) | If u is larger than repeat from step 2 |
| 6b) | If u is smaller than save $\hat{x}$ as $x_k^{(i)}$ and increment i |
| 7) | If i > L then quit |

The goal is to generate L "particles" at k using only the particles from k−1. This requires that a Markov equation can be written (and computed) to generate a $x_k$ based only upon $x_k$−1. This algorithm uses composition of the L particles from k−1 to generate a particle at k and repeats (steps 2-6) until L particles are generated at k.

This can be more easily visualized if x is viewed as a two-dimensional array. One dimension is k and the other dimension is the particle number. For example, x(k,i) would be the i-th particle at k and can also be written $x_k^{(i)}$ (as in the algorithm above). Step 3 generates a potential $x_k$ based on a randomly chosen particle $(x_k^{(i)})$ at time k−1 and rejects or accepts it in step 6. In other words, the $x_k$ values are generated using the previously generated $x_k$−1.

Kernel Based Machine Learning

A vast majority of localization techniques proposed for RFID are based on triangulation methods in Euclidean geometry. They utilize the geometrical properties of the RFID network to infer the RFID locations. A fundamentally different approach is discussed here. This approach is based on machine learning, which works directly on the natural non-Euclidean coordinate systems provided by the known reference RFID devices. The known locations of a few nodes in the network and the RFID readings can be exploited to construct signal strength or hop-count based function spaces that are useful for learning unknown RFID locations, as well as other extrinsic quantities of interest. As discussed further above, RTLS receivers in accordance with embodiments of the invention may provide reference location data that identifies locations to a high precision. This more precise location information can be used to refine less precise location information obtained by other methods. Two learning methods can be useful: the classification method and the regression method. These methods are especially suitable for RFID tracking applications.

Kernel methods are widely used in statistical learning. Positive definite symmetric (PDS) kernels implicitly specify an inner product in a Hilbert space where large-margin techniques are used for learning and estimation. A Hilbert space is a real or complex inner product space that is also a complete metric space with respect to the distance function induced by the inner product. PDS kernels can be combined with algorithms such as support vector machines (SVMs) or other kernel-based algorithms to form powerful learning techniques. SVMs are supervised learning models with associated learning algorithms that analyze data and recognize patterns, useful for classification and regression analysis and other tasks. An SVM constructs a hyperplane or set of hyperplanes in a high- or infinite-dimensional space. A good separation is achieved by the hyperplane that has the largest distance to the nearest training-data point of any class.

But the choice of the kernel, which is critical to the success of these algorithms, is typically left to the user. To limit the risk of a poor choice of kernel, in the last decade or so, a number of publications have investigated the idea of learning the kernel from data. Rather than requesting the user to commit to a specific kernel, which may not be optimal, in particular if the user's prior knowledge about the task is poor, learning kernel methods require the user only to supply a family of kernels. The task of selecting (or learning) a kernel out of that family is then reserved to the learning algorithm which, as for standard kernel-based methods, must also use the data to choose a hypothesis in the reproducing kernel Hilbert space (RKHS) associated to the kernel selected.

Next will be discussed the main theoretical, algorithmic, and empirical results related to learning kernels obtained in the last decade, including recent progress in all of these aspects in the last few years. In addition, software libraries and packages incorporating the implementation of several of the most effective learning kernel algorithms will be introduced and how to use these algorithms in applications to effectively improve performance particularly in location estimation.

Learning kernel is a fundamental topic for kernel methods and machine learning in general. Selecting the appropriate kernel can be important, in particular for SVMs. Significant improvements in this area will both reduce the requirements from the users when applying machine learning techniques and help achieve better performance. Additionally, the methods used for learning kernels, including the formulation and solution to the optimization techniques, the algorithms, and the theoretical insights can be useful in other areas of machine learning, such as learning problems with data-dependent hypotheses, feature selection or feature reweighting, distance learning, transfer learning and many others. Finally, there are many interesting questions in this area that have not been explored sufficiently yet. This will provide a convenient introduction to both standard and advanced material in this area, which will help in investigating these questions to better estimate the location of an object in the indoor environment.

Figure 28:
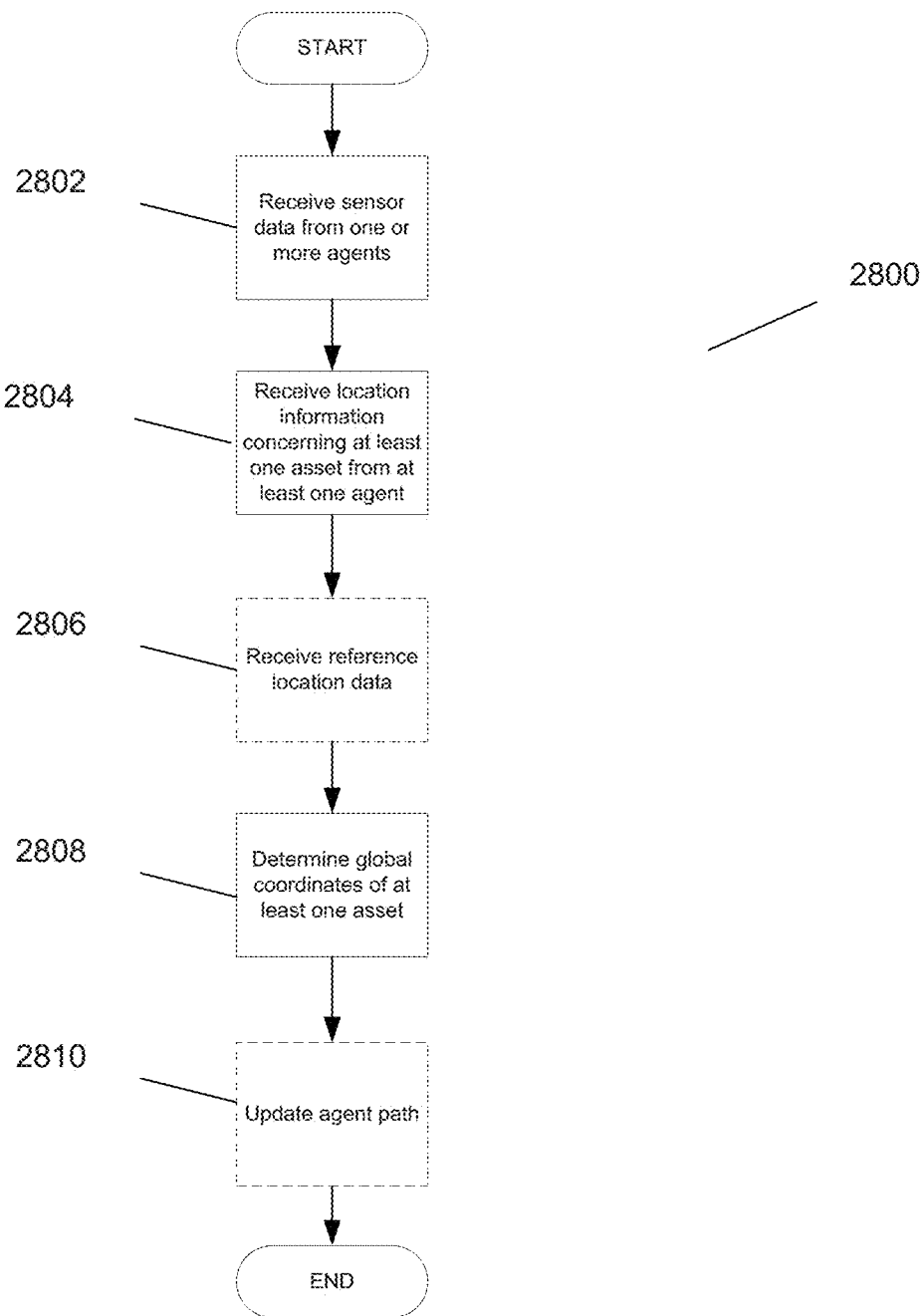
FIG. 28 is a flow chart illustrating a process for determining locations of tags and controlling mobile readers in accordance with embodiments of the invention.

Processes for Unifying Locations into a Global Coordinate System and Directing Mobile Readers In many embodiments of the invention, an inventory and agent control process converts the locations of RFID tags and/or other sensors that is expressed in the separate local coordinate systems of mobile readers that read them into a common global coordinate system. In further embodiments, the process determines proper antenna position for mobile agents and where to move each mobile agent for comprehensive coverage of RFID tags within the read area. An inventory and agent control process in accordance with several embodiments of the invention is illustrated in FIG. 28. In the illustrated process, an agent reads an RFID tag and determines the location of the RFID tag in local coordinates and sends the location data to a central location fusion server, which converts the tag location into global coordinates and determines whether an agent should change its position and/or the position of its antenna. The process may utilize anchor nodes which have a known location in determining the tag location. In several embodiments, a rotation matrix can be expressed and manipulated using quaternion algebra. The calculations using quaternion algebra are discussed in greater detail further below.

Figure 29A:
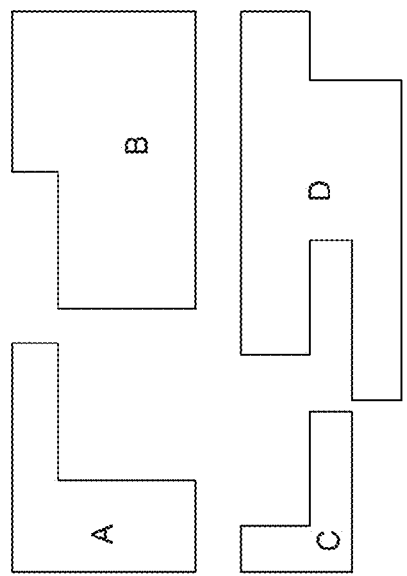
FIG. 29A is a diagram illustrating how a read area can be divided into subspaces for different mobile readers in accordance with embodiments of the invention.
Figure 29B:
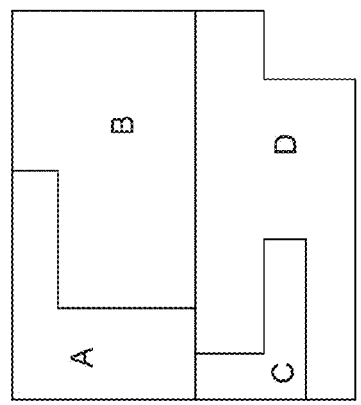
FIG. 29B is a diagram illustrating information that can be included in sensor data collected by a mobile agent in accordance with embodiments of the invention.
Figure 29B:
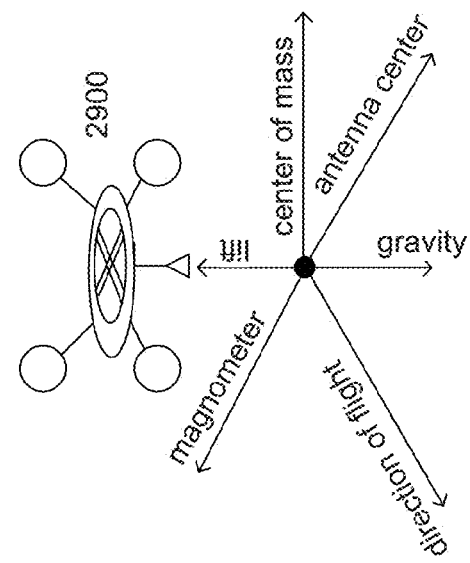

The process 2800 includes receiving (2802) sensor data from one or more agents. As described above, agent sensor data can include, but is not limited to, data from an accelerometer, magnetometer, gyroscope, and/or antenna position that are on-board an agent. An illustration showing an example of different read areas that agents may cover is shown in FIG. 29A. Four agents read in the discrete areas A, B, C, and D. An illustration visualizing examples of different components of sensor data collected by an agent 2900 and a tag 2902 on a shelf that the agent antenna is pointing to is shown in FIG. 29B.

The process includes receiving (2804) tag location data that describes the location of one or more tags. In many embodiments, the tag location data is specified with reference to the local coordinate system of the agent that read the tag.

The process can also include receiving (2806) reference location data. In several embodiments, reference location data can be obtained from anchor nodes—multi-modal sensors, such as way-points or anchors, that have known locations. Anchor nodes can be any of a variety of device or label such as, but not limited to, visual cues such optical LEDs, two dimensional bar codes or wireless Bluetooth or WiFi devices that broadcast their position. In many embodiments, a variety of anchor nodes are provided to achieve a diversity of information sources. An anchor node may be identified by a code or identifier that has an associated location stored in a database. In some embodiments, an anchor node may determine its location via GPS or other location system and broadcast its location. Reference location data can also include wide area location services that precisely identify the locations of antennas, readers, tags, and/or other assets to a high degree of accuracy.

The process includes determining (2808) global coordinates for the tag(s) that were read, i.e., converting the previously obtained local coordinates into a common coordinate system.

The process can include updating (2810) one or more agent's path by providing control signals to change its path for better coverage and/or to avoid obstacles. The process can be repeated to read tags, obtain locations, and update agent paths continuously.

Although a specific process is described above with respect to FIG. 28, one skilled in the art would recognize that any of a variety of processes may be utilized for inventory and agent control as appropriate to a particular application in accordance with embodiments of the invention.

Figure 30:
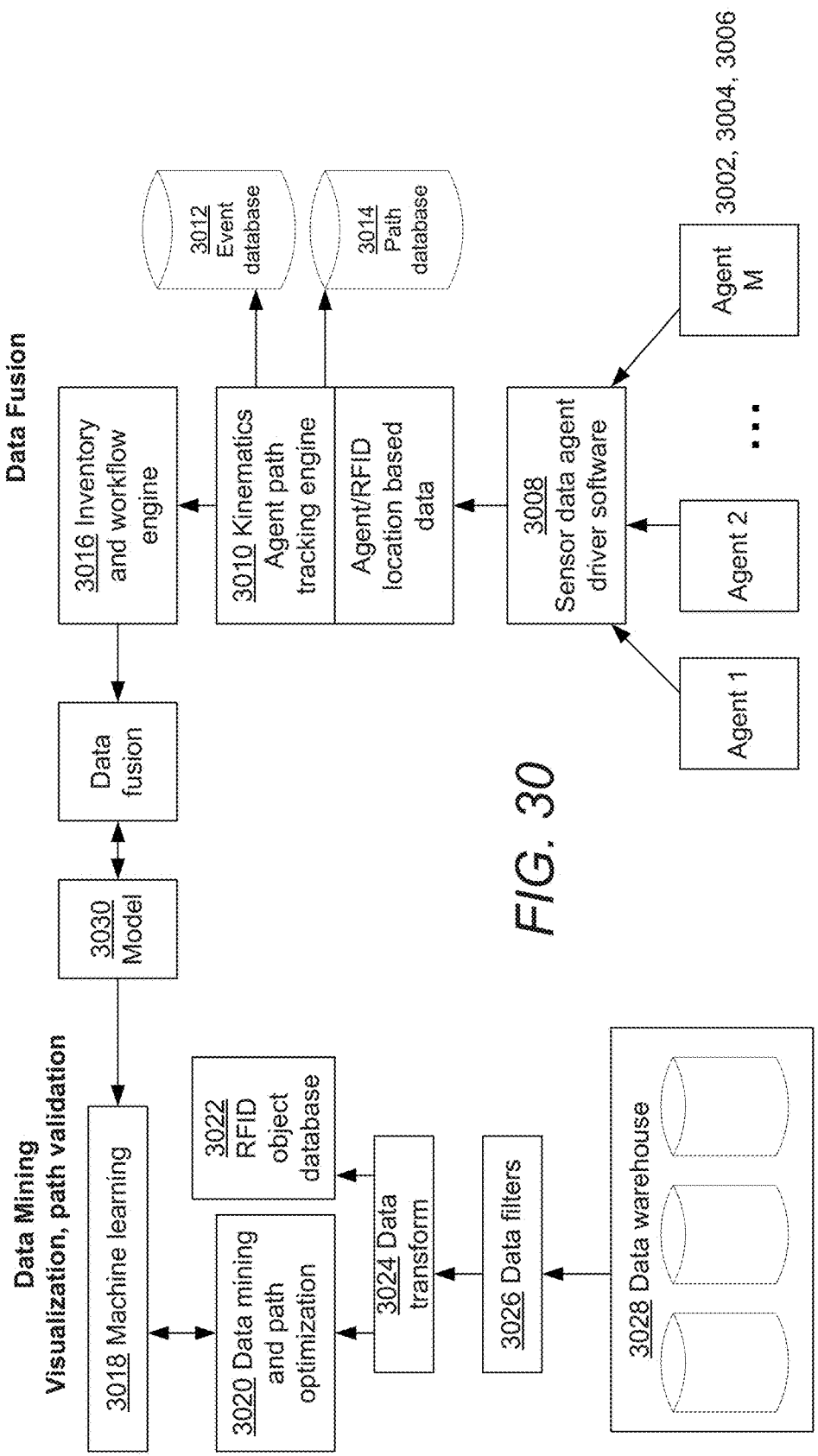
FIG. 30 is a system diagram conceptually illustrating a system for data fusion and data mining in generating a tag location in a global coordinate system and controlling mobile agents in accordance with embodiments of the invention.

A system configured to perform inventory and agent control, such as by implementing the processes described above, in accordance with embodiments of the invention is illustrated in FIG. 30. The illustrated system includes application modules that may be implemented any of a variety of ways including in memory storing software that configures a processor to perform computations or in firmware.

The system includes sensor data agent driver software 3008 that receives sensor data from Agents 1, 2, ... M (3002, 3004, 3006). The software 3008 collects sensor data (e.g., accelerometer, magnetometer, gyroscope, antenna position) from the agents and provides it to agent path tracking engine 3010. The agent path tracking engine 3010 uses location data concerning the locations of agents, RFID tags, and/or sensors to store events (such as a person appearing in the read area as an obstacle) in an event database 3012 and store path data in a path database 3014.

Inventory and workflow engine 3016 converts locations given in local coordinates into global coordinates. Data fusion refers to the continuous process of evaluating the antenna position of antennas on the agents and providing control signals to aim the antennas. A model 3030 created of the tag inventory can be provided to machine learning engine 3018. Machine learning can be used to improve location precision and designing agent paths for maximum reads. Data from data warehouse 3028 can be provided to the machine learning engine 3018 through data filters 3026, data transform 3024, and data mining and path optimization engine 3020. The data can also be stored in RFID object database 3022.

Figure 31:
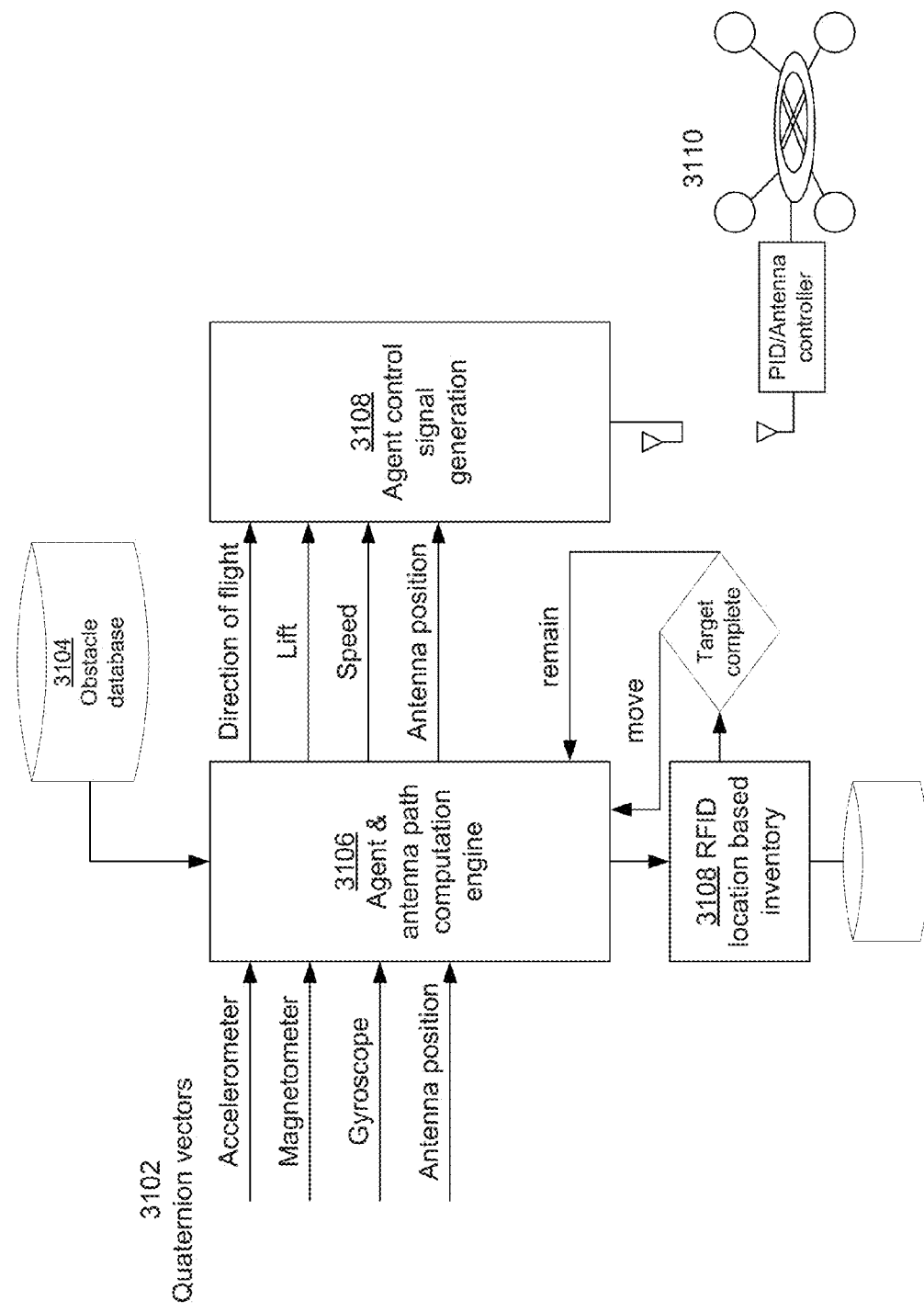
FIG. 31 is a more detailed system diagram conceptually illustrating a system for data fusion in generating a tag location and controlling mobile agents in accordance with embodiments of the invention.

A more detailed view of components of a data fusion portion of a system in accordance with several embodiments of the invention is illustrated in FIG. 31. Sensor data 3102 (e.g., accelerometer, magnetometer, gyroscope, antenna position) and obstacle data 3104 is provided to agent and antenna path computation engine 3106. Data from RFID tags that are read and their locations can be stored in RFID location based inventory database 3108. If there are tags that are unread, one or more agents may be instructed to move along their path and continue reading or remain in place and read additional tags in that location that have not yet been read. The computation engine 3106 can provide kinematics or control information (such as, but not limited to direction of flight, lift, speed, and antenna position) to agent control signal generation engine 3108. Agent control signal generation engine 3108 can instruct the agent 3110 (e.g., robot or drone) to keep it on the path that it should follow via proportional integral derivative (PID) or other appropriate control.

Figure 32:
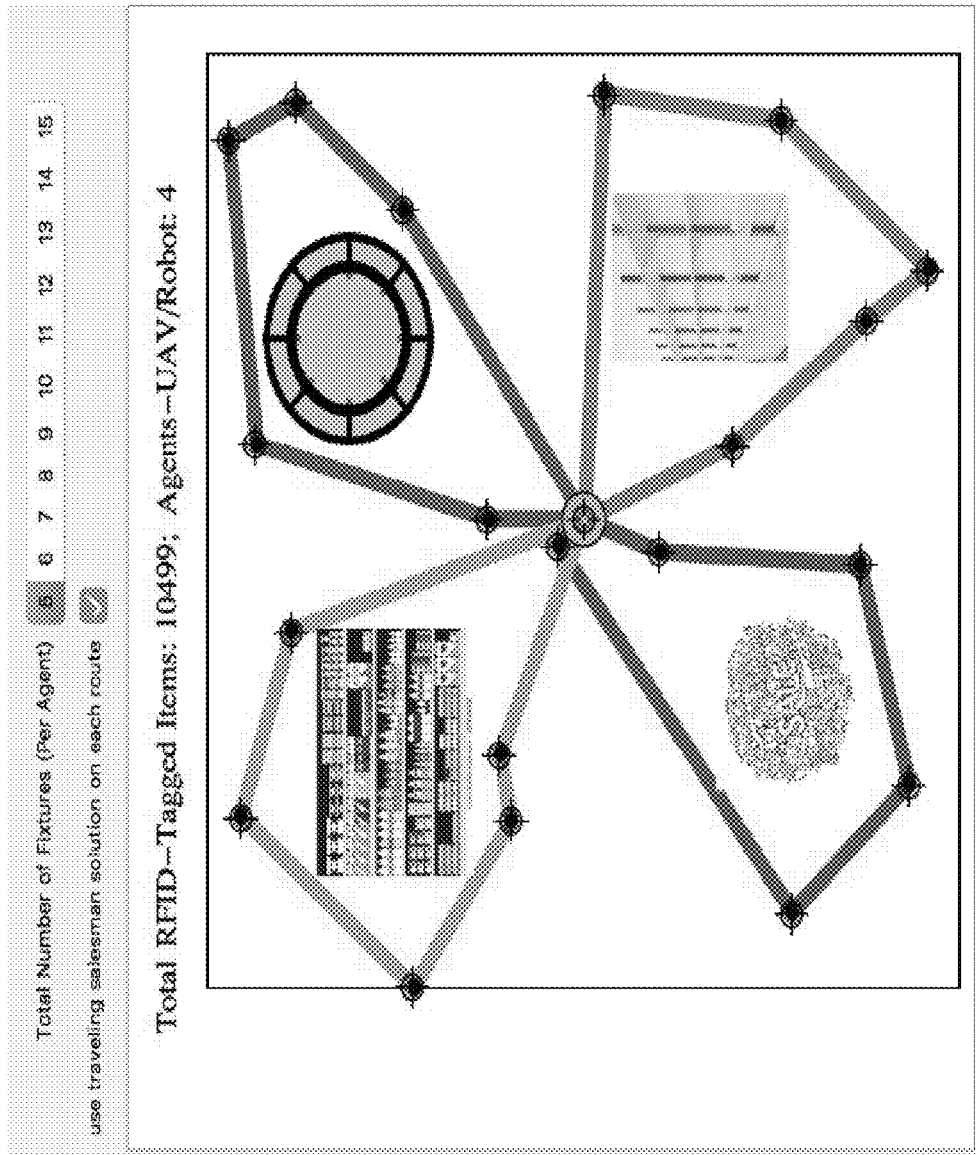
FIG. 32 is a diagram illustrating experimental results of four mobile readers roaming four different subspaces within a read area in accordance with embodiments of the invention.

FIG. 32 is a graphical user interface illustrating experimental results of four mobile readers roaming four different subspaces within a read area in accordance with embodiments of the invention. In several embodiments, the graphical user interface displays paths traversed for each mobile reader with waypoints and counts for numbers of tags that are read. In some embodiments, the interface enables a user to initiate scanning, interactively investigate items that appear, and/or modify the path of the agent in the event that some tags are not read.

Figure 33:
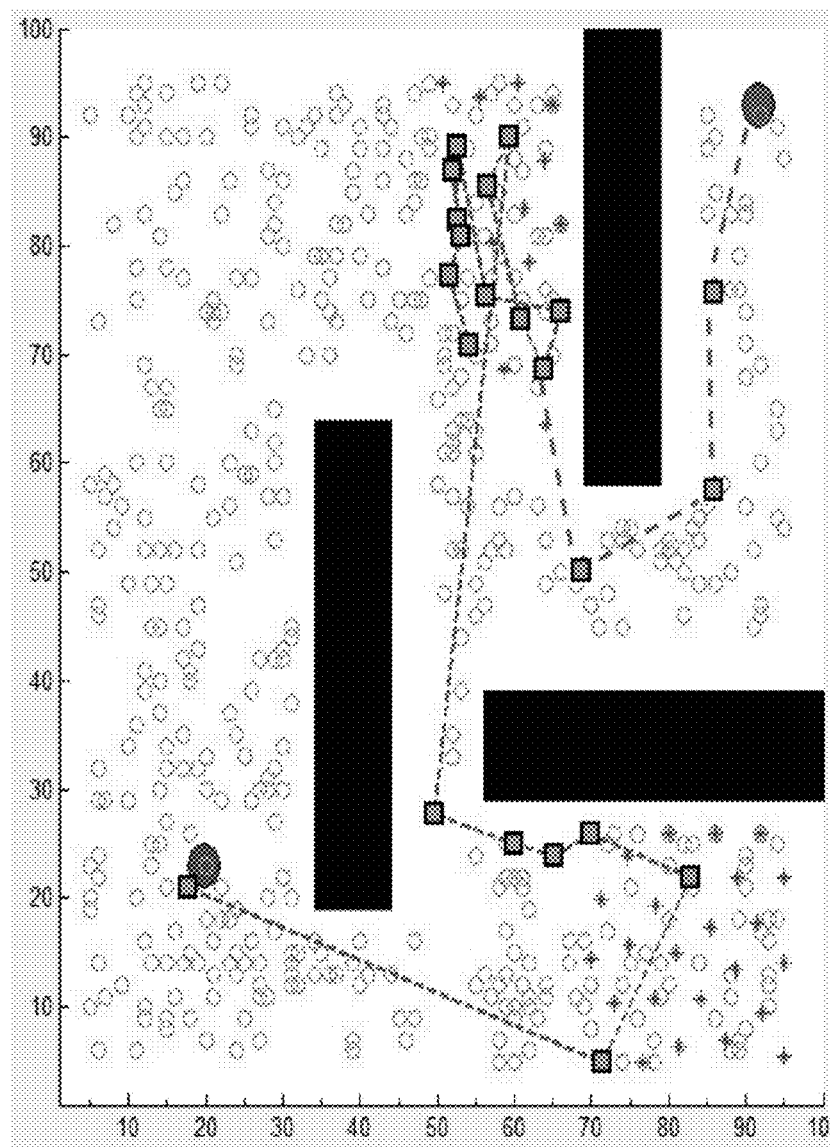
FIG. 33 is a diagram illustrating experimental results of a mobile reader following a path in reading tags in a read area in accordance with embodiments of the invention.

FIG. 33 is a graphical user interface illustrating experimental results of a mobile reader following a path in reading tags in a read area in accordance with embodiments of the invention. In several embodiments, the graphical user interface displays a path traversed by the mobile reader with waypoints and approximate locations for tags that are read. In some embodiments, the interface enables a user to initiate scanning, interactively investigate items that appear, and/or modify the path of the agent in the event that some tags are not read.

Although specific system architectures are described above with respect to FIGS. 30 and 31, one skilled in the art will recognize that any of a variety of architectures may be utilized in accordance with embodiments of the invention. Processes for data fusion using quaternion algebra are described below.

Processes for Data Fusion using Quaternion Algebra

The ambient space can be expressed as the three dimensional Euclidean space $\mathbb{R}^3$. Each agent's path and the position of its antenna can be computed and tracked to avoid collision with obstacles and other agents and people in the area, who could be employees or customers. In this section superscripts can be used to identify a set of agents, namely $A^1, A^2, \ldots A^m$. Each agent $A^i$ has an associated configuration subspace $C^i \subset \mathbb{R}^3$. The state space of the configurations of all agents simultaneously can be expressed as $X = C^1 \otimes C^2 \ldots \otimes C^m$ where $\otimes$ denotes the Cartesian product.

Two types of obstacles can be considered: 1) agent obstacles/people collisions and 2) agent-agent collisions. Let $x_{obs}^i = \{\underline{x} \in X | A^i(x_i) \cap 0 \neq \emptyset\}$ and $x_{obs}^{ij} = \{\underline{x} \in X | A^i(x^i) \cap A^j(x^j) \neq \emptyset\}$ where $$x_{obs} = \left(\bigcup_{i=1}^{m} x_{obs}^i\right) \cup \left(\bigcup_{\substack{i \neq j \\ i,j}} x_{obs}^{ij}\right).$$

In several embodiments, a decoupled agent path manager (DAPM) can be used in $\mathbb{R}^3$ to keep agents from colliding with each other, effectively, decoupling the problem of path planning for each agent. A DAPM can allocate individually dedicated spaces to cover different agents, therefore $$\bigcap_{\substack{i,j \\ i \neq j}} x_{obs}^{ij} = \phi$$

$x_{obs}$ is the union of a series of obstacles, approximated as a cylindrical structure with finite height. In the case of a drone the limited height presents an option to fly over the obstacle, whereas for a robot $x_{obs}$ can be completely characterized by 2D projection on the plane, hence simplifying obstacle avoidance into a two dimensional navigation problem.

A DAPM can be used to enforce $x_{obs}^{ij} = \emptyset$. This can be accomplished when the decomposed areas patrolled by each agent do not overlap.

The index i can be dropped from $A^i$ for the configuration space of each agent, without loss of generality. Quaternion $\underline{q}$ can be defined as a four component number $\underline{q} = q_0 + q_1 i + q_2 j + q_3 k$, where i, j, and k are imaginary numbers satisfying $i^2 = j^2 = k^2 = ijk = -1$ with conjugate $\underline{q}^c = q_0 - q_1 i - q_2 j - q_3 k$ then $|\underline{q}|^2 = \underline{q}\underline{q}^c$. For a unit 3D vector in $\mathbb{R}^3$, $\underline{u} = [\alpha \beta \gamma]$, $\underline{q} = \cos(\theta/2) + \sin(\theta/2)\underline{u}$, where $\underline{u} = \alpha i + \beta j + \gamma k$. Hence any 3D rotation matrix of angle $\theta$ and vector $\underline{u}$ in canonical base in $\mathbb{R}^3$ can be represented as:

$$R(\underline{q}) = \begin{bmatrix} -q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix}$$

with property $$\begin{cases} R(\underline{q}^c) = R^T(\underline{q}) = R^{-1}(\underline{q}) \text{ where } T \text{ is transpose and } -1 \text{ is inverse} \\ R(\underline{p}\underline{q}) = R(\underline{p})R(\underline{q}) \end{cases}$$

With quaternion algebra, three-dimensional rotation is equivalent to matrix multiplication of the associated quaternions. The discussion here will concern quaternions with real parts for unitary representation.

The attitude of the agent is represented as a quaternion in its own reference axis in A and the elevation angle of the antenna in the same reference axis. The global reference axis can be denoted $G_r$, and note that the quaternion in the local axis for the antenna element is with respect to $G_l$, the local coordinate axis, defined by the angle between quaternion of center of gravity and the vector perpendicular to the center of the antenna facing boresight.

Consider N three component measurements from agent, with three components for center of gravity, center of mass, components of gravity and magnetic field, antenna position, and $\underline{q}_1$ to $\underline{q}_N$ stored in vector $\underline{Q} = [\underline{q}_1 \ldots \underline{q}_N]$ where $\underline{q}_1$ to $\underline{q}_N$ are called the reference quaternion locations established in local coordinates of the agent with each reference having a known $R(\underline{q}_r)$ with respect to global coordinate $G_r$, and $\underline{q}_1 \ldots \underline{q}_N$ with respect to local coordinate $G_l$. Let $\underline{q}_{ij} = \underline{q}_i \underline{q}_j^c$. Denote matrix $$0 = \{\underline{q}_{ij}, \forall i, i=1, \ldots N\}.$$

Then:

1) Compute the eigenvector of 0, denoted by R.
2) Compute $\underline{s} = (R_r^* R_r)^{-1}(R_r^* Q_r)$, where * means transpose of conjugate, and index r corresponds to reference measurements.
3) Return $\underline{Q} = R\underline{s}$.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for generating the location of one or more sensor tags expressed in a three-dimension global coordinate system from the location of the one or more sensor tags expressed in three-dimensional local coordinate systems of mobile reader agents that read each tag and for updating the paths of each mobile reader, the method comprising:
receiving sensor data from one or more mobile reader agents;
receiving tag location data that describes the location of one or more sensor tags, each location of a sensor tag expressed in local coordinates of the subspace of the mobile reader agent that read the sensor tag, wherein the tag, location data that describes the location of one or more sensor tags is expressed as a quaternion in the form: $\underline{q}=q_0+q_1i+q_2j+q_3k$, where i, j, and k are imaginary numbers satisfying $i^2=j^2=k^2=ijk=-1$ with conjugate $\underline{q}^2=q_0-q_1i-q_2j-q_3k$ and $|\underline{q}|^2=\underline{q}\underline{q}^c$;
converting the tag location data into a three-dimensional global coordinate system that is common to all mobile reader agents; and
updating one or more paths of one or more mobile reader agents to increase the coverage of reading tags in the subspace of the mobile reader agent.

2. The method of claim 1 wherein the sensor data comprises information from an accelerometer, a magnetometer, a gyroscope, and the position of an antenna that are on-board a mobile reader agent.

3. The method of claim 1 wherein the one or more mobile reader agents are configured to roam distinct non-overlapping subspaces within a read area.

4. The method of claim 1 further comprising receiving reference location data that is obtained from at least one anchor node, where the anchor node has a known location in global coordinates.

5. The method of claim 1 wherein control of the mobile reader agent is provided via proportional integral derivative (PID) control.

6. The method of claim 1 wherein updating one or more paths of one or more mobile reader agents to increase the coverage of reading tags in the subspace of the mobile reader agent further comprises receiving obstacle data concerning agents and people in the read area.

7. The method of claim 1 wherein converting the tag location data into the three-dimensional global coordinate system that is common to all mobile reader agents comprises expressing the sensor data in quaternions and using quaternion algebra to rotate the matrix.

8. The method of claim 1 wherein updating the one or more paths of one or more mobile reader agents to increase the coverage of reading tags in the subspace of the mobile reader agent comprises computing a path for a mobile reader agent around obstacles that are expressed in the form:
$x_{obs}^i = \{\underline{x} \in X | A^i(x^i) \cap 0 \neq \emptyset\}$ and
$x_{obs}^{ij} = \{\underline{x} \in X | A^i(x^i) \cap A^j(x^j) \neq \emptyset\}$ where $$x_{obs} = \left(\bigcup_{i=1}^{m} x_{obs}^i\right) \cup \left(\bigcup_{\substack{i \neq j \\ i,j}} x_{obs}^{ij}\right).$$

9. The method of claim 1 wherein converting the tag location data into a global coordinate system that is common to all mobile reader agents comprises rotating the quaternion using a rotation matrix that is expressed as:

$$R(\underline{q}) = \begin{bmatrix} -q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{bmatrix}.$$

10. A sensor tag reader and location system for generating the location of one or more sensor tags expressed in a three-dimension global coordinate system from the location of the one or more sensor tags expressed in three-dimensional local coordinate systems of mobile readers that read each tag and for updating the paths of each mobile reader, the system comprising:
a processor; and
memory comprising an inventory and agent control application;
wherein the processor is configured by the inventory and agent control application to:
receive sensor data from one or more mobile reader agents;
receive tag location data that describes the location of one or more sensor tags, each location of a sensor tag expressed in local coordinates of the subspace of the mobile reader agent that read the sensor tag, wherein the tag location data that describes the location of one or more sensor tags is expressed as a quaternion in the form: $\underline{q}=q_0+q_1i+q_2j+q_3k$, where i, j, and k are imaginary numbers satisfying $i^2=j^2=k^2=ijk=-1$ with conjugate $\underline{q}^2=q_0-q_1i-q_2j-q_3k$ and $|\underline{q}|^2=\underline{q}\underline{q}^c$;
convert the tag location data into a three-dimensional global coordinate system that is common to all mobile reader agents; and
update one or more paths of one or more mobile reader agents to increase the coverage of reading tags in the subspace of the mobile reader agent.

11. The system of claim 10 wherein the sensor data comprises information from an accelerometer, a magnetometer, a gyroscope, and the position of an antenna that are on-board a mobile reader agent.

12. The system of claim 10 wherein the one or more mobile reader agents are configured to roam distinct non-overlapping subspaces within a read area.

13. The system of claim 10 wherein the processor is further configured by the inventory and agent control application to receive reference location data that is obtained from at least one anchor node, where the anchor node has a known location in global coordinates.

14. The system of claim 10 wherein control of the mobile reader agent is provided via proportional integral derivative (PID) control.

15. The system of claim 10 wherein the processor being configured to update one or more paths of one or more mobile reader agents to increase the coverage of reading tags in the subspace of the mobile reader agent further comprises the processor being configured to receive obstacle data concerning agents and people in the read area.

16. The system of claim 10 wherein the processor being configured to convert the tag location data into the three-dimensional global coordinate system that is common to all mobile reader agents further comprises the processor being configured to express the sensor data in quaternions and using quaternion algebra to rotate the matrix.

17. The system of claim 10 wherein the processor being configured to update the one or more paths of one or more mobile reader agents to increase the coverage of reading tags in the subspace of the mobile reader agent further comprises the processor being configured to compute a path for a mobile reader agent around obstacles that are expressed in the form: $x_{obs}^{i}=\{\underline{x} \in X | A^i(x^i) \cap 0 \neq \emptyset\}$ and $x_{obs}^{ij}=\{\underline{x} \in X | A^i(x^i) \cap A^j(x^j) \neq \emptyset\}$ where $$x_{obs} = \left(\bigcup_{i=1}^{m} x_{obs}^{i}\right) \cup \left(\bigcup_{\substack{i \neq j \\ i,j}} x_{obs}^{ij}\right).$$

18. The system of claim 10 wherein the processor being configured to convert the tag location data into a global coordinate system that is common to all mobile reader agents further comprises the processor being configured to rotate the quaternion using a rotation matrix that is expressed as:

$$R(\underline{q}) = \begin{bmatrix} -q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{bmatrix}.$$

* * * * *